United States Patent
Sorensen et al.

(12)

(10) Patent No.: US 6,225,404 B1
(45) Date of Patent: May 1, 2001

(54) THERMOPLASTIC COMPOUND

(75) Inventors: Kent Sorensen, Perstorp; Bo Pettersson, Lund, both of (SE); Louis Boogh, Crissier; Jan-Anders Edvin Mansson, Rivaz, both of (CH)

(73) Assignee: Perstorp AB, Perstorp (SE)

(*) Notice: Subject to any disclaimer, the term of this patent is extended or adjusted under 35 U.S.C. 154(b) by 0 days.

(21) Appl. No.: 09/194,515

(22) PCT Filed: May 21, 1997

(86) PCT No.: PCT/SE97/00822

§ 371 Date: Mar. 4, 1999

§ 102(e) Date: Mar. 4, 1999

(87) PCT Pub. No.: WO97/45474

PCT Pub. Date: Dec. 4, 1997

(30) Foreign Application Priority Data

May 28, 1996 (SE) .................................................. 9602019

(51) Int. Cl.⁷ ........................... C08G 63/20; C08G 83/00
(52) U.S. Cl. ........................ 525/54.1; 525/54.2; 525/54.3; 525/70; 525/71; 525/73; 525/77; 525/78; 525/79; 525/80; 525/83; 525/84; 525/87; 525/92 C; 525/92 J; 525/95
(58) Field of Search ................................. 525/54.1, 54.2, 525/54.3, 70, 71, 73, 77, 78, 79, 80, 83, 84, 87, 92 C, 92 J, 95

(56) References Cited

FOREIGN PATENT DOCUMENTS

| 0 572 267 | 12/1993 | (EP) . |
| WO95/06081 | 3/1995 | (WO) . |

*Primary Examiner*—Nathan M. Nutter
(74) *Attorney, Agent, or Firm*—Scully, Scott, Murphy & Presser

(57) ABSTRACT

A thermoplastic compound comprising at least one linear or branched thermoplastic polymer or copolymer, having at least one reactive or graftable site ($F_1$), which polymer is compounded with at least one hyperbranched dendritic polyester macromolecule being composed of a monomeric or polymeric nucleus and one or more monomeric or polymeric branching or spacing chain extenders. The macromolecule is optionally chain terminated and/or functionalized, whereby terminal chain extender functions, chain termination and/or functionalization provides the macromolecule with at least one reactive or graftable site ($F_2$) being reactive to or graftable onto said reactive or graftable site ($F_1$). In a further aspect, the invention relates to a thermoplastic composition comprising two or more components, whereby at least one is said thermoplastic compound. In yet a further aspect, the invention relates to a thermoplastic article made of one or more thermoplastic compounds, whereby at least one is said thermoplastic compound.

83 Claims, No Drawings

THERMOPLASTIC COMPOUND

CROSS-REFERENCE TO RELATED APPLICATION

This is a national phase application of International Application No. PCT/SE97/00822, filed May 21, 1997.

The present invention relates to a new thermoplastic compound comprising at least one linear or branched thermoplastic polymer or copolymer compounded with at least one hyperbranched dendritic polyester macromolecule. The linear or branched thermoplastic polymer or copolymer is fitted with at least one reactive or graftable site ($F_1$) and the hyperbranched dendritic macromolecule is through its terminal chain extender functions and/or through an optional chain termination and/or an optional functionalization fitted with at least one reactive or graftable site ($F_2$), which reactive or graftable site ($F_2$) is reactive to or graftable onto said reactive or graftable site ($F_1$). In a further aspect, the invention relates to a thermoplastic composition comprising at least two components, whereby at least one is said thermoplastic compound. In yet a further aspect, the invention relates to a thermoplastic article made of one or more thermoplastic compounds or compositions, whereby at least one is said thermoplastic compound.

Adhesion and compatibility phenomena have during recent years become important issues in many scientific and technological areas including or comprising various polymer combinations, mixtures and blends. The question of improved adhesion and/or compatibility between for instance various thermoplastic polymers is pronounced in areas such as joints, surface coatings, sandwich structures, composite materials and polymer blends. Adhesion depends on a complex series of processes comprising complementary as well as contradictory theories including the theories of mechanical interlocking, molecular entanglement, electrostatic adhesion, interlocking, boundary layers, interfaces, adsorption and wetting, interdiffusion and chemical bonding. Enhanced compatibility of immiscible phases of liquid or solid products is known to be affected by the use of for instance tensides working according to the principles of stabilising the polar/non-polar interface. Tensides are characteristically molecules having both a polar and a non-polar part. A tenside will orient its polar part towards a product surface having a certain polarity, whereas the non-polar part will orient towards a product surface being non-polar or less polar. However, although conventional tensides to a certain extent in thermoplastic blends, composites, filled thermoplastics and the like, will enhance compatibility and adhesion, they have molecular weights being too low to give significant effects in regard of improved mechanical properties. All adhesion processes mentioned above should contribute in order to obtain an optimised adhesion. Low molecular tensides will only affect a few of said adhesion processes positively and can even counteract other adhesion processes. The overall effect is thus that low molecular tensides most likely will merely act as plasticisers with a detrimental effect on the overall performance of thermoplastics.

In order to satisfy an ever increasing demand for new and/or more advanced thermoplastics and thermoplastic systems, interest has focused on blends and combinations of different polymers as well as different polymers and fillers and/or reinforcing materials as an inexpensive way to combine properties of different materials and to obtain thermoplastics for new and specific applications. Many thermoplastic polymers are incompatible with each other and/or various property modifying materials, such as filling and reinforcing materials, resulting in blends and combinations having poor mechanical properties. Additives such as compatibilisers and modifiers to improve the adhesion and/or compatibility between for instance different incompatible or near incompatible thermoplastic polymers are frequently used. An additive should, to obtain good adhesion in thermoplastic blends, composites, filled thermoplastics and the like, be designed to give a positive contribution throughout all known adhesion processes. The net adhesion will then be expected to become very efficient. A compatibilising additive should, to adhere to a non-polar surface, ideally have a long polymer, such as a polyolefine, tail of significant molecular weight, which tail can be attracted to a non-polar thermoplastic surface and adhere through closeness in surface energy and through molecular entanglement and interdiffusion. A compatibilising agent should also, to be able to adhere to a polar surface, ideally be provided with as large a polar surface as possible having a large number of polar and reactive sites or functions, such as hydroxyl groups. Adhesion to a polar surface can thus occur through electrostatic attraction forming for instance strong hydrogen bonds, through covalent bonds between a large number of reactive sites and a polar substrate as well as through chemical reaction between reactive sites being reactive to each other. A compatibilising additive should, furthermore, have a molecular weight high enough to not negatively affect mechanical properties and at the same time have a viscosity low enough to provide a maximised diffusion rate to the polar/non-polar interfaces of thermoplastic blends, composites, filled thermoplastics or the like to be compatibilised.

Normally two main types of polymers/copolymers are used as compatibilisers and modifiers: (a) block copolymers consisting of blocks of the materials to be combined and (b) those creating chemical bonds between the materials to be combined. The second type has the advantage of being less process demanding than the first one. A further type of compounds claimed to be useful as compatibilisers are disclosed in WO 95/106081. The compounds are branched fractal porous polymers comprising rigid aromatic recurring units having electrophilic or nucleophilic reactive moieties on the exterior thereof or are star polymers comprising a polymeric core being said fractal polymers and linear nitrogen containing polymeric moieties grafted to the exterior thereof.

A compatibiliser or modifier must in order to work satisfactorily fulfil at least two conditions, namely to reduce the interfacial energy between materials to be combined and to provide a good bonding therebetween. Graft polymers/copolymers are often used as compatibilisers to create chemical bonds and can be exemplified by maleic anhydride grafted polyolefines, such as polypropylene, commercially used as compatibiliser between for instance the otherwise incompatible polyolefines and polyamides. Maleic anhydride grafted polyolefines have a small polar group and few reactive sites, which is typical for most of the presently known and commercially used compatibilisers. The polyolefine part of the maleic anhydride grafted polyolefine is compatible with a polyolefine and the maleic anhydride part can create bonds with the polyamide. Polyolefines, especially polypropylene, and polyamides will hereinafter be used as model species.

The structure of a maleic anhydride grafted polyolefine, having one end standing maleic anhydride grafted onto a polyolefine chain, can be illustrated by below simplified Formula (I)

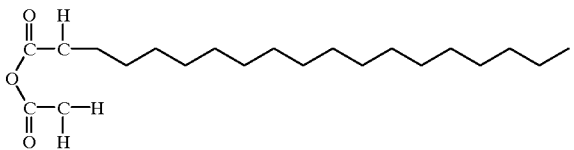

wherein

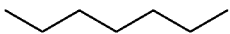

denotes a polyolefine chain of for instance Formula (II)

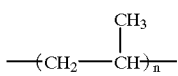

(polypropylene), wherein n is the degree of polymerisation.

Polyamides and polyolefines are two important species of thermoplastics used for large volume applications. Among polyamides, Polyamide 6 is, due to its high stiffness and good heat and abrasion resistance, commonly used as an engineering plastic in for instance the automotive industry. Polyolefines have the advantages of high chemical resistance, low density and good mechanical properties in addition of being relatively inexpensive.

The properties of polyamides and polyolefines are normally complementary to each other and it is thus of considerable interest to combine these materials to produce thermoplastic compositions and composites for specific applications. A specific example where a combination of materials overcomes the deficiencies of either material alone are parts to car bodies which can be made of for instance reinforced polypropylene, but the surface will be rough and difficult or impossible to paint. However, if a thin layer of polyamide is coated onto the polypropylene a smooth surface possible to paint will be obtained. A significant problem is that it is very difficult to obtain acceptable bonding between these two polymers. A further limiting problem is the choice of reinforcing material used in the polypropylene. A combination between for instance the non-polar polypropylene and frequently used polar reinforcing or filling materials will most certainly result in poor or reduced mechanical properties.

Recent studies of thermoplastic compositions comprising incompatible or near incompatible materials have been focused on improved bonding between different polymers. An often used method is the previously disclosed use of maleic anhydride grafted polymers. An additional drawback of increasing importance is that it in recycling of plastics is difficult or impossible to separate incompatible materials, why a method making incompatible materials compatible would provide a major advantage and make recycling of mixed polymers easier.

The present invention provides a new thermoplastic compound providing surprisingly excellent compatibilising properties. Blends or mixed compositions comprising different, such as incompatible or immiscible, thermoplastic polymers and/or reinforcing materials, fillers and the like can thus more easily be prepared. Also combinations of thermoplastics and thermosets can be produced. The thermoplastic compound of the present invention is suitably and preferably used as a compatibilising agent and fulfils above discussed and for compatibilisers necessary properties, such as a large polar surface having a large number of polar and/or reactive sites or functions. The thermoplastic compound comprises at least one linear or branched thermoplastic polymer and at least one hyperbranched dendritic macromolecule built up from ester or polyester units, optionally in combination with ether or polyether units. The thermoplastic compound of the present invention is primarily used as modifier and/or compatibiliser, but can also advantageously be used as sole thermoplastic material. The present invention furthermore provides a thermoplastic composition and a thermoplastic article having improved mechanical properties. The composition and the article comprises said thermoplastic compound, which compound by means of its specific composition and structure provides said improved properties and/or, by making the use of otherwise incompatible materials possible, contributes to said improved properties.

The adhesion and the compatibility is increased by the surprisingly increased diffusion rate obtained by introduction, in accordance with the present invention, of a high polarity and/or reactive. This is obtained by at least one hyperbranched dendritic macromolecule having one or more to a thermoplastic polymer reactive or graftable terminal sites or functions. The hyperbranched dendritic macromolecule provides the polar surface and thus the polar or reactive sites or functions. Hyperbranched dendritic macromolecules substantially built up from polyester units are furthermore known to be rheology modifying giving low viscosity systems despite a high or very high molecular weight. The nature and type of the terminal functions or sites provide for instance a reactivity and/or a polarity making it possible to combine otherwise incompatible materials. Embodiments of the thermoplastic compound will thus be reactive, in accordance with the general reaction criteria for respective terminal function, to a number of functions or sites frequently included in various thermoplastic polymers or copolymers and thereby provide a chemical or physical bond between the thermoplastic compound and one or more additional thermoplastic polymers or copolymers and/or thermosetting polymers. Terminal epoxide groups can for instance react with $NH_2$ groups of polyamide or introduce a polarity into a non-polar polymer allowing for instance a polar filler to be incorporated into a polyolefine without loss of mechanical properties due to poor adhesion between filler and polymer caused by the difference in polarity. Terminal carboxyl groups can for instance react with hydroxyfunctional or epoxide functional thermoplastic polymers or copolymers. A non-polar polymer or copolymer chain provided, in accordance with embodiments of the thermoplastic compound of the present invention, with one preferably end standing and for instance hydroxyfunctional hyperbranched dendritic macromolecule will exhibit one polar and one non-polar end providing compatibility with both polar and non-polar polymers or copolymer. The thermoplastic compound of the present invention has the effect of homogenising for instance highly mineral, such as chalk, filled polyolefines thus resulting in thermoplastic compositions and products exhibiting superior quality without or with substantially less imperfections typical for mineral filled polymers. The thermoplastic compound furthermore implies improved processability, during for instance various moulding operations, due to rheology modifying properties. Polymers or polymer compositions exhibiting for instance dilatancy often exhibit Newtonian behaviour when they are modified with a thermoplastic compound according to the present invention.

The thermoplastic compound of the present invention comprises at least one linear or branched thermoplastic polymer or copolymer fitted with at least one reactive or graftable site ($F_1$) and compounded with at least one hyperbranched dendritic macromolecule substantially built up from ester or polyester units optionally in combination with ether or polyether units. Said components are advantageously compounded in for instance an extruder. The hyperbranched dendritic macromolecule is composed of a monomeric or polymeric nucleus, having at least one reactive epoxide, hydroxyl, carboxyl or anhydride group, to which nucleus are added 1–100, preferably 1–20 and most preferably 2–8, branching generations comprising at least one monomeric or polymeric branching chain extender having at least three reactive groups of which at least one is a hydroxyl group and at least one is a carboxyl or anhydride group, and optionally at least one spacing generation comprising at least one spacing chain extender. The spacing chain extender is preferably a compound having two reactive groups being one hydroxyl group and one carboxyl or anhydride group or is an inner ether, such as a lactone, of such a compound. The terminal chain extender functions of the hyperbranched dendritic macromolecule are substantially hydroxyl, carboxyl or anhydride groups and the hyperbranched dendritic macromolecule is optionally completely or partly chain terminated by at least one monomeric or polymeric chain stopper and/or functionalized. Said hyperbranched dendritic macromolecule is through said terminal chain extender functions and/or through said optional chain termination and/or functionalization fitted with at least one reactive or graftable site ($F_2$) being reactive to or graftable onto said reactive or graftable site ($F_1$).

The reactive or graftable site ($F_1$) of the polymer or copolymer is in preferred embodiments of the thermoplastic compound a hydroxyl, epoxide, carboxyl, anhydride, amine, amide, imide, cyano, sulphonate, halide, ester, alkenyl or alkynyl group. Further embodiments of said reactive or graftable site ($F_1$) include generated radical sites and abstractable hydrogens. Radical sites can be generated by a variety of methods including, chemical, photochemical, radiation, mechanical mastication and thermal degradation. The reactive or graftable site ($F_2$) of the macromolecule is in likewise preferred embodiments a hydroxyl, epoxide, carboxyl, anhydride, amine, amide, imide, cyano, sulphonate, halide, ester, alkenyl or alkynyl group.

Hyperbranched dendritic macromolecules, including dendrimers, can generally be described as three dimensional highly branched molecules having a treelike structure. Dendrimers are highly symmetric, while similar macromolecules designated as hyperbranched may to a certain degree hold an asymmetry, yet maintaining the highly branched treelike structure. Dendrimers can be said to be monodisperse or substantially monodisperse hyperbranched dendritic macromolecules. Hyperbranched dendritic macromolecules normally consist of an initiator or nucleus having one or more reactive sites or functions and a number of branching layers and optionally one or more spacing layers and/or a layer of chain terminating molecules. Continued replication of branching layers normally yields increased branch multiplicity and, where applicable or desired, increased number of terminal functions. The layers are usually called generations and the branches dendrons. Hyperbranched dendritic macromolecules (dendrimers) can be illustrated by below simplified Formulas (III) and (IV) wherein X and Y are initiators or nuclei having four and two reactive functions, respectively, and A, B and C are branching chain extenders having three (A and C) and four (B) reactive functions, each branching chain extender forming one branching generation in the macromolecule. T is a terminating chain stopper or a suitable terminal function or site, such as a hydroxyl, carboxyl or epoxide group. The hyperbranched dendritic macromolecule of Formula (III) holds four equal and the hyperbranched dendritic macromolecule of Formula (IV) two equal so called dendrons linked to respective nucleus. The dendrons of the macromolecule of Formula (III) is as disclosed by simplified Formula (V).

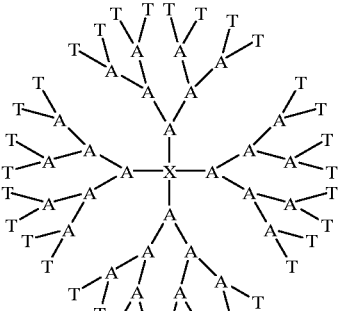

Formula (III)

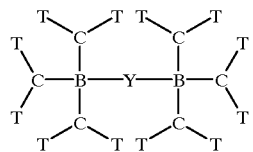

Formula (IV)

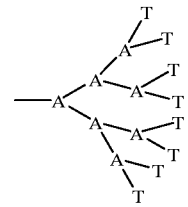

Formula (V)

A dendron can be pre-produced and then added to a nucleus. A dendron can be produced by for instance condensing one or more hydroxyfunctional carboxylic acids at normal esterification temperatures, by allowing mono, di, tri or polyfunctional carboxylic acids to form esterlinks with mono, di, tri or polyfunctional alcohols or epoxides or by similar procedures resulting in esterlinks, etherlinks or other chemical bonds. The raw materials used to produce a dendron must be chosen to provide at least one terminal reactive site to be reacted with a nucleus or initiator.

A hyperbranched dendritic macromolecule is distinguished from the well-known ordinary linear or branched molecules or macromolecules and likewise distinguished from the well-known so called star or star branched molecule. Hyperbranched dendritic macromolecule as disclosed by Formula (III), (IV) and (VI) can by no means be compared with said well-known molecules, neither in regard of molecular structure nor in regard of chemical and/or physical properties. Increased branch replication in a hyperbranched dendritic macromolecule yields increased branch density and if desired increased number of terminal functions or sites, neither of these distinguishing properties are exhibited by said well-known and ordinary molecules. Increased branch replication in a star or star branched molecule or macromolecule does neither yield said increased branch density nor said increased number of terminal functions or sites. A star or starbranched macromolecule can be illustrated by below simplified Formula (VI) wherein X is a nucleus having six reactive sites, D is a linear or branched chain extender having two reactive sites and T is a chain termination or suitable terminal function or site.

Formula (VI)

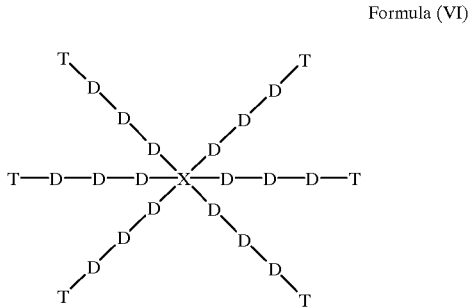

The thermoplastic polymer or copolymer of the thermoplastic compound according to the present invention is preferably a thermoplastic graft polymer or copolymer composed of at least one unsaturated monomer grafted onto a thermoplastic polymer or copolymer, whereby providing said polymer or copolymer with at least one preferably end standing reactive site ($F_1$). The monomer is in these embodiments preferably an unsaturated compound having at least one C=C bond and at least one reactive hydroxyl, epoxide, carboxyl, anhydride, amine, amide, imide, cyano or sulphonate group, such as acrylic acid, methacrylic acid, crotonic acid, maleic anhydride, fumaric acid, hydroxyalkylacrylate, hydroxyalkylmethacrylate or acrylonitrile.

The thermoplastic polymer or copolymer has in various preferred embodiments a molecular weight of 500 to 500000, such as 1000 to 100000 or 5000 to 50000 and is selected from the polymer group consisting of:
i) polyalkylene;
ii) poly(alkylene oxide);
iii) poly(oxyalkylene);
iv) poly(haloalkylene);
v) poly(alkylene phthalate or terephthalate);
vi) poly(phenyl or phenylene);
vii) poly(phenylene oxide or sulphide);
viii) poly(vinyl acetate);
ix) poly(vinyl alcohol);
x) poly(vinyl halide);
xi) poly(vinylidene halide);
xii) poly(vinyl nitrile);
xiii) polyamide;
xiv) polyimide;
xv) polycarbonate;
xvi) polysiloxane;
xvii) poly(acrylic or methacrylic acid);
xviii) poly(acrylate or methacrylate);
xix) a natural polymer, such as cellulose or a derivative thereof; and
xx) a synthetic polymer, such as a synthetic rubber; or
is a thermoplastic copolymer, which copolymer comprises at least one monomer being identical to any monomer included in said polymers.

Above polymers can suitably be exemplified by cellulose acetate, cellulose propionate, cellulose acetate butyrate, cellulose acetate propionate, carboxymethyl cellulose, cellulose nitrate, alkylcellulose, polyamide, polybutylene, poly(butylene terephthalate), polyethylene, poly(ethylene oxide), poly(chlorotrifluoro ethylene), poly(diallyl phthalate), poly(ethylene terephthalate), polyisobutylene, poly(methyl methacrylate), poly(4-methyl pentylene), poly(oxymethylene), polypropylene, poly(propylene oxide), poly(phenylene sulphone), polystyrene, poly(tetrafluoro ethylene), poly(vinyl acetate), poly(vinyl alcohol), poly(vinyl butyral), poly(vinyl chloride), poly(vinylidene chloride), poly(vinylidene fluoride), poly(vinyl fluoride), poly(vinyl formal), poly(vinyl carbazole), poly(vinyl pyrrolidone), poly(acrylonitrile butadiene styrene), poly(acrylonitrile methylmethacrylate), poly(acrylonitrile styrene acrylate), poly(ethylene ethylacrylate), poly(ethylene propylene), poly(ethylene vinyl acetate), poly(tetrafluoroethylene hexafluoropropylene), poly(styrene butadiene), poly(styrene-α-methylstyrene), poly(vinyl chloride ethylene), poly(vinyl chloride ethylene methacrylate), poly(vinyl chloride methyl acrylate), poly(vinyl chloride vinyl acetate), poly(vinyl chloride vinylidene chloride), poly(diallyl isophthalate).

The nucleus of the hyperbranched dendritic macromolecule included in the thermoplastic compound according to the present invention is most preferably a mono, di, tri or polyfunctional alcohol or is an alkoxylate thereof, that is a reaction product between a mono, di, tri or polyfunctional alcohol and an alkylene oxide, such as ethylene oxide, propylene oxide, butylene oxide and/or phenylethylene oxide. Suitable alcohols and alkoxylates include 5-ethyl-5-hydroxymethyl-1,3-dioxane, 5,5-dihydroxymethyl-1,3-dioxane, ethylene glycol, diethylene glycol, triethylene glycol, propylene glycol, dipropylene glycol, pentanediol, neopentyl glycol, 1,3-propanediol, 2-methyl-2-propyl-1,3-propanediol, 2-ethyl-2-butyl-1,3-propanediol, cyclohexanedimethanol, trimethylolpropane, trimethylolethane, glycerol, erythritol, anhydroenneaheptitol, ditrimethylolpropane, ditrimethylolethane, pentaerythritol, methylglucoside, dipentaerythritol, tripentaerythritol, glucose, sorbitol, ethoxylated trimethylolethane, propoxylated trimethylolethane, ethoxylated trimethylolpropane, propoxylated trimethylolpropane, ethoxylated pentaerythritol and propoxylated pentaerythritol.

The nucleus of the hyperbranched dendritic macromolecule is in further preferred embodiments a mono, di, tri or polyfunctional epoxide, preferably selected from the group consisting of:
i) glycidyl esters of monofunctional carboxylic acids having 1–24 carbon atoms;
ii) glycidyl ethers of monofunctional alcohols having 1–24 carbon atoms;
iii) glycidyl ethers of di, tri or polyfunctional alcohols;
iv) mono, di or triglycidyl substituted isocyanurates;
v) glycidyl ethers of condensation products between at least one phenol and at least one aldehyde or oligomers of such condensation products;
vi) glycidyl ethers of condensation products between at least one phenol and at least one ketone or oligomers of such condensation products; and
vii) glycidyl ethers of reaction products between at least one mono, di, tri or polyfunctional alcohol and ethylene, propylene, butylene and/or phenylethylene oxide.

The nucleus of the hyperbranched dendritic macromolecule is in yet further embodiments a carboxyfunctional compound preferably selected from the group consisting of:
i) mono, di, tri or polyfunctional saturated carboxylic acids or anhydrides;
ii) mono, di, tri or polyfunctional unsaturated carboxylic acids or anhydrides;
iii) carboxyfunctional adducts of mono, di, tri or polyfunctional saturated carboxylic acids or anhydrides; and/or iv) carboxyfunctional adducts of mono, di, tri or polyfunctional unsaturated carboxylic acids or anhydrides.

Further suitable and in certain embodiments preferred nuclei include mono, di, tri or polyhydroxyfunctional carboxylic acids or anhydrides, such as 2,2-dimethylolpropionic acid, α,α-bis(hydroxymethyl)butyric acid, α,α,α-tris(hydroxymethyl)-acetic acid, α,α-bis(hydroxymethyl)valeric acid, α,α-bis(hydroxy)propionic acid, 3,5-dihydroxybenzoic acid or α,β-dihydroxypropionic acid. One or more dendrons produced from hydroxyfunctional carboxylic acids or anhydrides can be added to these nuclei can be reacted, whereby the hyperbranched dendritic macromolecule can be composed of one single monomer species.

The branching chain extender of the hyperbranched dendritic macromolecule is in preferred embodiments at least one compound selected from the group consisting of:
i) an aliphatic di, tri or polyhydroxyfunctional saturated or unsaturated monocarboxylic acid or anhydride;
ii) a cycloaliphatic di, tri or polyhydroxyfunctional saturated or unsaturated monocarboxylic acid or anhydride;
iii) an aromatic di, tri or polyhydroxyfunctional monocarboxylic acid or anhydride;
iv) an aliphatic monohydroxyfunctional saturated or unsaturated di, tri or polycarboxylic acid or anhydride;
v) a cycloaliphatic monohydroxyfunctional saturated or unsaturated di, tri or polycarboxylic acid or anhydride;
vi) an aromatic monohydroxyfunctional di, tri or polycarboxylic acid or anhydride; and
vii) an ester prepared from two or more of said hydroxyfunctional carboxylic acids or anhydrides.

Hydroxyfunctional acids are especially preferred as branching chain extenders and can suitably be exemplified by 2,2-dimethylolpropionic acid, α,α-bis-(hydroxymethyl)butyric acid, α,α,α-tris(hydroxymethyl)acetic acid, α,α-bis-(hydroxymethyl)valeric acid, α,α-bis(hydroxy)propionic acid, 3,5-dihydroxybenzoic acid, α,β-dihydroxy- propionic acid, heptonic acid, citric acid, d- or l-tartaric acid, dihydroxymaloic acid and/or d-gluconic acid.

The optional spacing chain extender of the hyperbranched dendritic macromolecule is suitably and preferably an aliphatic, cycloaliphatic or aromatic monohydroxyfunctional monocarboxylic acid or anhydride or is an inner ether of a monohydroxyfunctional monocarboxylic, such as a lactone. Spacing chain extenders include such compounds as hydroxyacetic acid, hydroxyvaleric acid, hydroxypropionic acid, hydroxypivalic acid, glycolide, δ-valerolactone, β-propiolactone and ε-caprolactone.

Branching or spacing chain extenders can furthermore suitably be reaction products between at least one di, tri or polycarboxylic acid or anhydride and at least one epoxide, preferably a glycidyl ester or ether comprising at least one alkenyl group, such as glycidylacrylate, glycidyl- methacrylate and allylglycidylether.

The optional chain termination of said hyperbranched dendritic macromolecule is preferably performed by means of a chain stopper having 1–24 carbon atoms. The optional chain stopper is suitably selected from the group consisting of:
i) an aliphatic or cycloaliphatic saturated or unsaturated monofunctional carboxylic acid or anhydride;
ii) a saturated or unsaturated fatty acid or anhydride;
iii) an aromatic monofunctional carboxylic acid or anhydride;
iv) a diisocyanate, an oligomer or an adduct thereof;
v) a glycidyl ester of a monofunctional carboxylic acid or anhydride;
vi) a glycidyl ether of a monofunctional alcohol;
vii) an adduct of an aliphatic or cycloaliphatic saturated or unsaturated mono, di, tri or polyfunctional carboxylic acid or anhydride;
viii) an adduct of an aromatic mono, di, tri or polyfunctional carboxylic acid or anhydride;
ix) an epoxide of an unsaturated monocarboxylic acid or corresponding triglyceride, which acid has 3–24 carbon atoms;
x) an aliphatic or cycloaliphatic saturated or unsaturated monofunctional alcohol;
xi) an aromatic monofunctional alcohol;
xii) an adduct of an aliphatic or cycloaliphatic saturated or unsaturated mono, di, tri or polyfunctional alcohol; and/or
xiii) an adduct of an aromatic mono, di, tri or polyfunctional alcohol.

Said chain stoppers are suitably exemplified by formic acid, acetic acid, propionic acid, butanoic acid, hexanoic acid, acrylic acid, methacrylic acid, crotonic acid, lauric acid, linseed fatty acid, soybean fatty acid, tall oil fatty acid, dehydrated castor fatty acid, crotonic acid, capric acid, caprylic acid, acrylic acid, methacrylic acid, benzoic acid, behenic acid, montanoic acid, p-tert.butylbenzoic acid, abietic acid, sorbic acid, 1-chloro-2,3-epoxypropane, 1,4-dichloro-2,3-epoxybutane, epoxidised soybean fatty acid, 5-methyl-5-hydroxymethyl-1,3-dioxane, 5-ethyl-5-hydroxymethyl-1,3-dioxane, glycerol diallyl ether, trimethylolpropane diallyl ether maleate, trimethylolpropane diallyl ether, pentaerythritol triallyl ether, pentaerythritol triacrylate, pentaerythritol triethoxylate triacrylate, toluene-2,4-diisocyanate, toluene-2,6-diisocyanate, hexamethylene diisocyanate, phenyl isocyanate or isophorone diisocyanate.

The reactive or graftable site ($F_2$) of the hyperbranched dendritic macromolecule is advantageously obtained through functionalization, such as addition, oxidation, epoxidation and/or allylation, of the hyperbranched dendritic macromolecule and/or its optional chain termination. Said functionalization is preferably performed using an epihalohydrin, such as epichlorohydrin; an allylhalid, such as allylchloride or allylbromide; or an acrylonitrile yielding at least one cyano group. Further suitable and preferred functionalizations include addition of at least one unsaturated anhydride to a nucleophilic end group, such as —O⁻ or —$N_2^-$ or a Michael addition of at least one unsaturated anhydride, such as maleic anhydride, to an unsaturation within of the dendritic of hyperbranched macromolecule and/or its chain termination. Oxidation is a preferred functionalization and is suitably performed using an oxidising agent, such as a peroxy or haloperoxy acid or anhydride, which can be exemplified by peroxyformic acid, peroxyacetic acid, peroxybenzoic acid, m-chloroperoxybenzoic acid, trifluoroperoxyacetic acid and/or mixtures thereof or therewith. An oxidation may yield for instance secondary epoxide groups.

The most preferred embodiment of the thermoplastic compound of the present invention is a linear or branched thermoplastic polymer or copolymer fitted with at least one reactive functional site ($F_1$), preferably an anhydride group, to which reactive site ($F_1$) a hyperbranched dendritic macromolecule fitted with at least one reactive functional site ($F_2$), preferably an hydroxyl or epoxide group, is bonded. Very suitable alternatives to above embodiments are a linear or branched thermoplastic polymer or copolymer fitted with at least one graftable site ($F_1$) onto which polymer or copolymer at least one hyperbranched dendritic macromolecule fitted with at least one reactive or graftable site ($F_2$) being an alkenyl group is grafted. Grafting is suitably performed by any of the well-known graft procedures, such as free-radical-initiated graft polymerisation which is closely related to free-radical-induced vulcanisation, activation grafting wherein reactive sites on the polymer substrate are created by absorption of radiant energy, and transfer grafting.

Said most preferred embodiment can be exemplified by below simplified Formula (VII) wherein a maleic anhydride grafted polyolefine chain of formula (I) is bonded to a second generation dendritic macromolecule having hydroxyl groups as terminal functions. The nucleus X and the chain extenders A and B are as defined for Formula (III) and

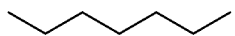

denotes a polyolefine chain.

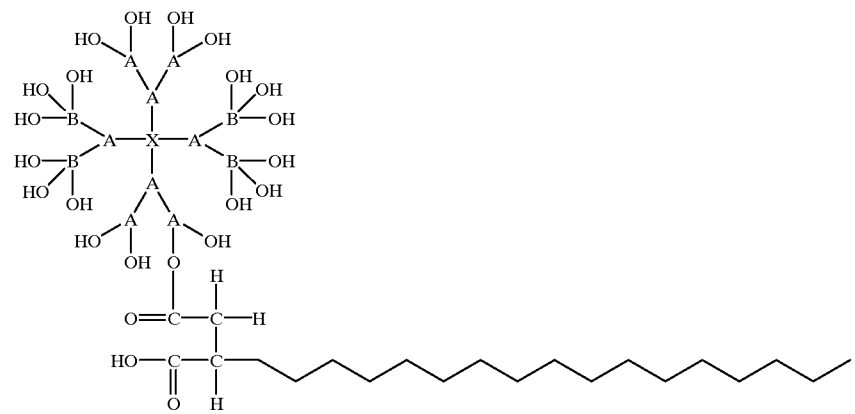

iv) poly(haloalkylene);
v) poly(alkylene phthalate or terephthalate);
vi) poly(phenyl or phenylene);
vii) poly(phenylene oxide or sulphide);
viii) poly(vinyl acetate);
ix) poly(vinyl alcohol);
x) poly(vinyl halide);
xi) poly(vinylidene halide);
xii) poly(vinyl nitrile);
xiii) polyamide;
xiv) polyimide;
xv) polycarbonate;
xvi) polysiloxane;
xvii) poly(acrylic or methacrylic acid);
xviii) poly(acrylate or methacrylate);
xix) a natural polymer, such as cellulose or a derivative thereof; and
xx) a synthetic polymer, such as a synthetic rubber; or Hyperbranched dendritic macromolecules built up from ester or polyester units optionally in combination with ether or polyether units, as utilised in the present invention, combine high molecular weight, high reactivity and low viscosity. They present a high potential as compatibilisers or components in compatibilisers and can be adapted to reach desired properties in different material systems by modifying the shell chemistry. In for instance thermoplastic composites, incorporation of said hyperbranched dendritic macromolecules imply increased control of for instance the matrix/filler interfacial properties, filler dispersion, viscosity and fiber wetting. The mechanical properties and the processability can be optimised by controlling these parameters.

In a further aspect, the present invention relates to a thermoplastic composition comprising two or more components, whereby at least one is a thermoplastic compound as previously disclosed, preferably in an amount of 0.001–75%, such as 0.01–30%, by weight of said composition.

The composition comprises preferably and in addition to said thermoplastic compound at least one reinforcing, material, such as glass fibers or glass particles, which material suitably is surface treated with for instance at least one silane, such as methacrylsilane and/or aminosilane. Further additional components include at least one thermoplastic polymer or copolymer selected from the polymer group consisting of:
i) polyalkylene;
ii) poly(alkylene oxide);
iii) poly(oxyalkylene);

is a thermoplastic copolymer, which copolymer comprises at least one monomer being identical to any monomer of said polymers, whereby the polymer included in the thermoplastic compound according to the invention and the additional polymer can be the same or different.

The thermoplastic composition of the present invention can in various embodiments comprise at least one pigment and/or at least one filling, modifying, reinforcing, fire retarding and/or lubricating additive. These additives comprises in preferred embodiments a mineral, such as chalk, mica or graphite and/or is selected from the group consisting of cellulose, glass particles, glass fibers, carbon fibers, aramid fibers, steel fibers and/or thermoplastic fibers.

The thermoplastic components included in the thermoplastic composition of the present invention can individually be present in form of pellets, granules, powders, rods, sheets, blocks and the like. The components, thermoplastics as well as non-thermoplastics, are advantageously and easily mixed by means of co-extrusion, compounding, milling or other processing techniques to yield a blend. The composition is in especially preferred embodiments thus a homogeneous material or a homogeneous blend and can suitably be produced to form pellets, a powder, granules, rods, sheets, blocks and the like.

In yet a further aspect, the present invention refers to a thermoplastic article made of one or more thermoplastic compounds, whereby at least one is the thermoplastic compound of the present invention as previously disclosed, which compound preferably is combined with one or more linear or branched thermoplastic polymers or copolymers and/or one or more thermoplastic compositions comprising one or more linear or branched thermoplastic polymers or copolymers. Said additional polymers or copolymers are suitably selected from the group consisting of:
i) polyalkylene,
ii) poly(alkylene oxide);
iii) poly(oxyalkylene);
iv) poly(haloalkylene);
v) poly(alkylene phthalate or terephthalate);
vi) poly(phenyl or phenylene);
vii) poly(phenylene oxide or sulphide);
viii) poly(vinyl acetate);
ix) poly(vinyl alcohol);
x) poly(vinyl halide);
xi) poly(vinylidene halide);
xii) poly(vinyl nitrile);
xiii) polyamide;
xiv) polyimide;
xv) polycarbonate;
xvi) polysiloxane;
xvii) poly(acrylic or methacrylic acid);
xviii) poly(acrylate or methacrylate);
xix) a natural polymer, such as cellulose or a derivative thereof; and
xx) a synthetic polymer, such as a synthetic rubber; or
are thermoplastic copolymers comprising at least one monomer being identical to any monomer of said polymers.

The thermoplastic article of the present invention is favourably reinforced by particles and/or fibers, such as cellulose, chalk, mica, glass particles, glass fibers, carbon or graphite fibers, aramid fibers, steel fibers and/or thermoplastic fibers. A thermoplastic fiber material suitably consists of or comprises at least one thermoplastic polymer or copolymer selected from the same polymer group as said additional polymers and/or copolymers. Reinforcing particles and fibers are advantageously glass particles or glass fibers which advantageously are surface treated with for instance at least one silane, such as methacrylsilane and/or aminosilane.

The properties of the thermoplastic compound facilitates manufacture of articles comprising more or less incompatible materials, such as various composite structures, and incorporation of reinforcing materials regardless polarity. The thermoplastic article of the present invention is thus advantageously:

a) laminated, sheet moulded or by other means applied to yield a composite structure with at least one additional thermoplastic compound or thermoplastic composition comprising at least one thermoplastic polymer or copolymer for instance selected from the previously defined polymer and copolymer groups;

b) laminated, sheet moulded or by other means applied to yield a composite structure, in form of an overlay, an underlay or an intermediate layer, with at least one metal, such as copper, tin, aluminium, nickel, chromium etc.;

c) laminated, sheet moulded or by other means applied to yield a composite structure, in form of an overlay, an underlay or an intermediate layer, with at least one cellulose based substrate; and/or d) laminated, sheet moulded or by other means applied to yield a composite structure, in form of an overlay, an underlay or an intermediate layer, with at least one thermosetting material or thermosetting composite material.

A thermosetting material or a thermosetting composite material as disclosed under section d) above preferably comprises at least one thermosetting resin selected from the group consisting of;
i) chain terminated hyperbranched dendritic macromolecules of polyester type having at least one primary or secondary reactive site being for instance an epoxide group, an amino group, an alkenyl group or an anhydride group, preferably obtained through chain termination of said macromolecules;
ii) monomeric or polymeric epoxides;
iii) rubber modified monomeric or polymeric epoxides;
iv) saturated or unsaturated esters;
v) saturated or unsaturated polyesters;
vi) hydroxyfunctional saturated or unsaturated esters;
vii) hydroxyfunctional saturated or unsaturated polyesters;
viii) polyamines or polyamides;
ix) bismaleimides;
x) phenol-formaldehyde resins;
xi) phenolic amino resins;
xii) polyimides or polyetherimides;
xiii) melamine-formaldehyde resins;
xiv) urea-formaldehyde resins;
xv) isocyanates; and
xvi) urethanes or polyurethanes having any of the functional groups —OH, —COOH or —NCO;
which thermosetting resin optionally comprises at least one curing agent, catalyst, inhibitor and/or stabiliser.

The thermoplastic article of the present invention is suitably and advantageously a semi-finished or finished article selected from the group consisting of:
i) aeronautic goods and articles;
ii) nautic goods and articles;
iii) household goods and articles;
iv) interior and exterior building materials and articles;
v) automotive coatings, goods and articles;
vi) sporting goods and articles;
vii) leisure and commodity goods and articles; and
viii) electric and electronic goods and articles.

These and other objects and the attendant advantages will be more fully understood from the following detailed description, taken in conjunction with embodiment Examples 1–33. Without further elaboration, it is believed that one skilled in the art can, using the preceding description, utilise the present invention to its fullest extent. The following preferred specific embodiments are, therefore, to be construed as merely illustrative and not limitative of the true spirit and scope of the invention in any way whatsoever. Examples 1–33 discloses:

Example 1: Second generation hyperbranched dendritic polyester macromolecule.

Example 2: Thermoplastic compound comprising maleic anhydride grafted polypropylene and the macromolecule of Example 1.

Example 3: Thermoplastic compound comprising maleic anhydride grafted polypropylene and the macromolecule of Example 1.

Example 4: Thermoplastic composition comprising a thermoplastic compound similar to Example 2.

Example 5: Thermoplastic composition comprising a thermoplastic compound similar to Example 3.

Example 6: Comparative thermoplastic composition.

Example 7: Mixed thermoplastic compositions comprising the composition of Example 4.

Example 8: Mixed thermoplastic compositions comprising the composition of Example 5.

Example 9: Mixed thermoplastic compositions comprising the composition of Example 6.

Example 10: Injection moulding of the compositions of Examples 7–9 and pure polyamide.

Example 11: Tensile modulus of specimens produced in Example 10.

Example 12: Lamination of specimens produced in Example 10 and determination of the critical strain energy release rate of obtained laminates.

Example 13: Thermoplastic composition comprising a mineral filled polypropylene and thermoplastic compounds similar to those of Examples 2 and 3. Compounding carried out once.

Example 14: Same as Example 13. Compounding carried out twice.

Example 15: Comparative thermoplastic composition comprising a mineral filled polypropylene.

Example 16: Injection moulding of the compositions of Examples 13–15.

Example 17: Tensile modulus and yield strength of specimens produced in Example 16.

Example 18: Thermoplastic compound comprising maleic anhydride grafted polypropylene and the macromolecule of Example 1.

Example 19: Thermoplastic composition comprising the thermoplastic compound of Example 18, polypropylene and glass fibers.

Example 20: Comparative thermoplastic composition comprising maleic anhydride grafted polypropylene, polypropylene and glass fibers.

Example 21: Comparative thermoplastic composition from polypropylene and glass fibers.

Example 22: Yield and chappy impact strength of specimens produced from the compositions of Examples 19–21.

Example 23: Third generation hyperbranched dendritic polyester macromolecule.

Example 24: Chain termination of the third generation hyperbranched dendritic polyester macromolecule of Example 23.

Example 25: Functionalization of the chain terminated hyperbranched dendritic polyester macromolecule of Example 24.

Example 26: Comparison of Theological behaviour between pure polypropylene, a blend comprising polypropylene and maleic anhydride grafted polypropylene and a blend comprising polypropylene, maleic anhydride grafted polypropylene and small amounts of the functionalized chain terminated hyperbranched dendritic macromolecule of Example 25.

Example 27: Reduction in interfacial tension between polypropylene and polyamide phases when employing blends containing interfacial promoters according to the present invention.

Example 28: Bonding between a maleic anhydride grafted polypropylene and the epoxy functional product obtained in Example 25.

Example 29: The effect on tensile strength and residual strength after cracking for a glass mat thermoforming (GMT) material.

Example 30: Interfacial properties between polypropylene blends and poly(methylmetacrylate).

Example 31: Adhesion between a polypropylene blend without and with a polypropylene compounded with a hyperbranched dendritic polyester.

Example 32: Reaction between partially degraded polypropylene containing reactive groups and the hydroxyfunctional hyperbranched dendritic polyester according to Example 23.

Example 33: Critical strain energy release rate in compression moulded plaques of a polypropylene blend containing a thermoplastic composition according to the present invention and a polyamide plaque.

EXAMPLE 1

A hyperbranched dendritic polyester macromolecule was prepared from ethoxylated pentaerythritol and 2,2-dimethylolpropionic acid.

308.9 g (0.85 mole) of pentaerythritol pentaethoxylate (Polyol PP 50, Perstorp Polyols, Sweden), 460.5 g (3.42 moles) of 2,2-dimethylolpropionic acid (Bis-MPA, Perstorp Polyols, Sweden) and 0.46 g (0.004 mole) of $H_2SO_4$ (96%-w/w) were charged in a 4-necked reaction flask equipped with stirrer, pressure gauge, cooler and receiver. The temperature was raised to 120° C., at which temperature 2,2-dimethylolpropionic acid began to melt and esterification water was formed. The temperature was thereafter during 20 minutes raised to 140° C., giving a transparent solution, whereby a vacuum of 30–50 mm Hg was applied. The reaction was, under stirring, allowed to continue for 4 hours, after which time the acid value was determined to be 7.0 mg KOH/g. 460.5 g (6.84 moles) of 2,2-dimethylolpropionic acid and 0.7 g (0.007 mole) of $H_2SO_4$ (96%-w/w) were now during 15 minutes added to the reaction mixture. A vacuum of 30–50 mm Hg was applied when charged 2,2-dimethylolpropionic acid was dissolved. The reaction was now allowed to continue for a further 4 hours giving a final acid value of ≈10 mg KOH/g.

Obtained second generation hyperbranched dendritic macromolecule exhibited the following properties:

| | |
|---|---|
| Acid value, mg KOH/g: | 10.2 |
| Hydroxyl value, mg KOH/g: | 500 |
| Molecular weight, g/mole: | 1824 |

EXAMPLE 2

A thermoplastic compound was prepared from a maleic anhydride grafted polypropylene and the hyperbranched dendritic macromolecule obtained in Example 1.

40 g of the hyperbranched dendritic macromolecule of Example 1 was mixed with 3700 g of a commercially available polypropylene grafted with maleic anhydride (0.46% by weight) and having a molecular weight of 71090. The mixture was compounded in a twin screw extruder at a temperature of 180° C. and a screw speed of 50 rpm. A reaction between maleic anhydride groups of the polypropylene and hydroxyl groups of the hyperbranched dendritic macromolecule occurred during the extrusion, whereby the grafted polypropylene were bonded to said macromolecule. The extrudate was finally pelletised. The compound gave not rise to any processing problems during extrusion or pelletising.

EXAMPLE 3

Example 2 was repeated with the difference that 50 g of the hyperbranched dendritic macromolecule of Example 1 was used. The compound gave not rise to any processing problems during extrusion or pelletising.

EXAMPLE 4

A thermoplastic composition was prepared from a maleic anhydride grafted polypropylene, the hyperbranched dendritic macromolecule obtained in Example 1 and polypropylene.

40 g of the hyperbranched dendritic macromolecule of Example 1, 3700 g of a commercially available polypropylene grafted with maleic anhydride (0.46% by weight) and having a molecular weight of 71090 and 16305 g of polypropylene (Appryl 3050 MN1, Elf Atochem SA, Switzerland) were mixed. The mixture was compounded in a twin screw extruder at a temperature of 180° C. and a screw speed of 50 rpm. A reaction between maleic anhydride groups of the grafted polypropylene and hydroxyl groups of the hyperbranched dendritic macromolecules occurred during the extrusion, whereby the grafted polypropylene were bonded to said macromolecule and whereby a thermoplastic composition comprising a thermoplastic compound similar to that of Examples 2 and polypropylene was obtained. The extrudate was finally pelletised. The composition gave not rise to any processing problems during extrusion or pelletising.

EXAMPLE 5

Example 4 was repeated with the difference that 50 g of the hyperbranched dendritic macromolecule of Example 1 and 6305 g of polypropylene were used, resulting in a thermoplastic composition comprising a thermoplastic compound similar to that of Examples 3 and polypropylene. The composition gave not rise to any processing problems during extrusion or pelletising.

EXAMPLE 6

Comparative Example

A thermoplastic composition was prepared from a maleic anhydride grafted polypropylene and polypropylene.

739 g of a commercially available polypropylene grafted with maleic anhydride (0.46% by weight) and having a molecular weight of 71090, was mixed with 3261 g of polypropylene (Appryl 3050 MN1, Elf Atochem SA, Switzerland). The mixture was compounded at a temperature of 180° C. and a screw speed of 50 rpm, whereby a thermoplastic composition comprising the maleic anhydride grafted polypropylene and polypropylene was obtained. The extrudate was finally pelletised. Reaction during the extrusion did not occur. The composition gave not rise to any processing problems during extrusion or pelletising.

EXAMPLE 7

Three thermoplastic mixed compositions were prepared from the polypropylene composition obtained in Example 4 and polyamide.

3500 g of the composition according to Example 4 was mixed with 35 g (1 w/w-%), 184 g (5 w/w-%) and 617 g (15 w/w-%) by weight of polyamide 6 (Orgamide Resno, Elf Atochem SA, Switzerland). The mixture was compounded in a twin screw extruder at a temperature of 220° C. and a screw speed of 40 rpm, whereby a mixed thermoplastic compositions comprising a thermoplastic compound according to the invention, polypropylene and polyamide was obtained. The extrudate was finally pelletised. The composition gave not rise to any processing problems during extrusion or pelletising. The compositions gave not rise to any processing problems during extrusion or pelletising.

EXAMPLE 8

Example 7 was repeated with the difference that 3500 g of the composition according to Example 5 was used instead of 3500 g of the composition according to Example 4. The compositions gave not rise to any processing problems during extrusion or pelletising.

EXAMPLE 9

Comparative Example

Example 7 was repeated with the difference that 3500 g of the composition according to Example 6 was used instead of 3500 g of the composition according to Example 4. The compositions gave not rise to any processing problems during extrusion or pelletising.

EXAMPLE 10

The compositions of Examples 7–9 and pure polyamide 6 were injection moulded to form test specimens. Injection moulding was performed using a Butler 10/90 Hi Tech moulding tool provided with a 51×51 mm rectangular mould having a depth of 4 mm. The injection temperature was 230° C. and inserts were placed in the mould to vary the thickness of obtained specimens. The thickness of the specimens produced from the compositions of Examples 7–9 were 3.1 mm and corresponding specimens produced from pure polyamide 6 were 1.2 mm. The injection moulded specimens were used for evaluation of the tensile modulus exhibited by said compositions of Examples 7–9 and to produce laminates between specimens made of said compositions and specimens made of pure polyamide.

EXAMPLE 11

The tensile modulus of specimens produced in Example 10 were determined.

Samples having the dimensions 10×50×3.1 mm were cut in the injection direction from the injection moulded specimens as produced in Example 10 from the compositions of Examples 7–9. The samples were dried for 72 hours in a vacuum oven at 80° C. The tensile tests were performed on a UTC apparatus equipped with a 1 kN load cell. Five tests were carried out on each composition and below given figures are an average of said five tests.

| Tensile Modulus | | | |
| --- | --- | --- | --- |
| Percentage Polyamide 6 | 1% | 5% | 15% |
| Compositions acc. to Example 7, tensile modulus, GPa | 1.46 | 1.60 | 1.67 |
| Compositions acc. to Example 8, tensile modulus, GPa | 1.55 | 1.63 | 1.75 |
| Compositions acc. to Example 9, tensile modulus, GPa | 1.37 | 1.46 | 1.60 |

The compositions according to Examples 7 and 8 exhibit at all performed tests and compared to Example 9 (comparative example) an increased tensile modulus.

EXAMPLE 12

Laminates were produced from the specimens obtained in Example 10 from compositions of Examples 7–9 and polyamide 6 specimens likewise obtained in Example 10. The laminates between one specimen made of a composition according to Examples 7–9 and one specimen made of polyamide 6 were produced in an Interlaken Series 3300 apparatus. Each specimen was first machined to the dimensions 49.5×49.5×3.1 mm to fit in the mould and then cleaned with acetone. A Kapton release film was applied to each surface being in contact with the upper and lower mould surface and a 15 mm wide piece of Kapton film was placed between the two specimens to be laminated to act as crack initiator. The specimens were then placed in the mould and laminated at a pressure of 10 kN and a temperature of 220° C. The heat was after 10 minutes turned off and cooling initiated. The pressure was maintained until the temperature of the upper mould reached 30° C. The pressure was now released, the mould opened and obtained laminates removed.

Sample being 10 mm wide were cut from obtained laminates and polished with a 220 grid sand paper until smooth. The samples were dried in a vacuum oven for 72 hours at 80° C. The crack initiator of Kapton release film was removed with a scalpel. The crack propagation was accomplished by forcing a 0.45 mm thick wedge into the interface at a speed of 2 mm/minute. The wedge test was performed on a UTS apparatus. The crack propagation was video filmed and analysed by a computer and the critical strain energy release rate (Gc) was determined. Below given figures are an average of five tests.

| Critical Strain Energy Release Rate (Gc) | | | |
|---|---|---|---|
| Percentage Polyamide 6 | 1 | 5 | 15 |
| Compositions acc. to Example 7, Gc, J/m$^2$ | 190 | 220 | 360 |
| Compositions acc. to Example 8, Gc, J/m$^2$ | 490 | 660 | 690 |
| Compositions acc. to Example 9, Gc, J/m$^2$ | 160 | 205 | 230 |

The compositions according to Examples 7 and 8 exhibit substantially increased, 56% and 300% respectively, Gc-values compared to the composition according to Example 9 (comparative example). The bond strength between polypropylene and polyamide 6 is substantially improved by a thermoplastic compound according to the present invention in comparison to unmodified and maleic anhydride modified polypropylene.

EXAMPLE 13

A thermoplastic composition was prepared from a maleic anhydride grafted polypropylene, the hyperbranched dendritic macromolecule obtained in Example 1 and a mineral filled polypropylene.

10 g of the hyperbranched dendritic macromolecule of Example 1, 1990 g of a commercially available polypropylene grafted with maleic anhydride (0.46% by weight) and having a molecular weight of 71090 and 2000 g of a highly (60% by weight) mineral (chalk) filled polypropylene were mixed. The mixture was compounded in a twin screw extruder at a temperature of 220° C. and a screw speed of 40 rpm. A reaction between maleic anhydride groups of the grafted polypropylene and hydroxyl groups of the hyperbranched dendritic macromolecules occurred during the extrusion, whereby the grafted polypropylene were bonded to said macromolecules and whereby a thermoplastic composition comprising a thermoplastic compound similar to those of Examples 2 and 3 and mineral filled polypropylene was obtained. The extrudate was finally pelletised. The composition gave not rise to any processing problems during extrusion or pelletising.

EXAMPLE 14

Example 13 was repeated with the difference that the composition was compounded at a temperature of 220° C. and at a screw speed of 40 rpm twice instead of once in the twin screw extruder.

EXAMPLE 15

Comparative Example

A thermoplastic composition was prepared from a maleic anhydride grafted polypropylene and a mineral filled polypropylene.

2000 g of a commercially available polypropylene grafted with maleic anhydride (0.46% by weight) and having a molecular weight of 71090 and 2000 g of a highly (60% by weight) mineral (chalk) filled polypropylene were mixed. The mixture was compounded in a twin screw extruder at a temperature of 220° C. and a screw speed of 40 rpm, whereby a thermoplastic composition comprising a maleic anhydride grafted polypropylene and a mineral filled polypropylene was obtained. The extrudate was finally pelletised. Reaction during the extrusion did not occur. The composition gave not rise to any processing problems during extrusion or pelletising.

EXAMPLE 16

The compositions of Examples 13–15 were injection moulded in accordance with Example 10 to form specimens of the dimensions 51×51×4 mm. Injection moulding of the composition according to Example 15 was difficult due to a non-Newtonian behaviour. It was thus almost difficult using standard conditions to completely fill the mould. The compositions according to Example 13 and 14 were easy to injection mould and problems during the injections were not experienced with these compositions. The compositions according to Examples 13 and 14 both exhibited a Newtonian behaviour resulting in high quality specimens with smooth surfaces without visible imperfections.

EXAMPLE 17

The tensile modulus and the yield strength of the specimens produced in Example 16 were determined.

Samples having the dimensions 10×50 mm were cut in the injection direction from the injection moulded specimens produced in Example 16, treated and tested according to Example 11 for determination of the tensile modulus. Five tests were carried out on each composition and below given figures are an average of said five tests.

| | Result | |
|---|---|---|
| Composition acc. to | Tensile Modulus (MPa) | Yield Strength (MPa) |
| Example 13 | 2601 | 26.8 |
| Example 14 | 2714 | 29.8 |
| Example 15 | 2499 | 25.2 |

The tensile modulus and the yield strength of the compositions according to Examples 13 and 14 are markedly increased compared to Example 15 (comparative example).

EXAMPLE 18

Example 2 was repeated with the difference that 35.0 g of the hyperbranched dendritic macromolecule of Example 1 and 2843.6 g of the polypropylene grafted with maleic anhydride were used. The compound gave not rise to any processing problems during extrusion or pelletising.

EXAMPLE 19

A thermoplastic composition was prepared from the thermoplastic compound of Example 18, polypropylene and glass fibers.

81 g of the thermoplastic compound of Example 18, 819 g of polypropylene (Appryl 3050 MN1, Elf Atochem SA, Switzerland) and 10 g glass fibers (fiber length 3 mm) surface treated with methacrylsilane and aminosilane were mixed. The mixture was compounded twice in a twin screw extruder at a temperature of 220° C. and a screw speed of 30 rpm. The extrudate was finally pelletised. The composition gave not rise to any processing problems during extrusion or pelletising.

EXAMPLE 20

Comparative Example

A thermoplastic composition was prepared from maleic anhydride grafted polypropylene, polypropylene and glass fibers.

81 g of a commercially available polypropylene grafted with maleic anhydride (0.46% by weight) and having a molecular weight of 71090, 819 g of polypropylene (Appryl 3050 MN1, Elf Atochem SA, Switzerland) and 10 g of glass fibers (fiber length 3 mm) surface treated with methacrylsilane and aminosilane were mixed. The mixture was compounded twice in a twin screw extruder at a temperature of 220° C. and a screw speed of 30 rpm. The extrudate was finally pelletised. The composition gave not rise to any processing problems during extrusion or pelletising.

EXAMPLE 21

Comparative Example

A thermoplastic composition was prepared from polypropylene and glass fibers.

900 g of polypropylene (Appryl 3050 MN1, Elf Atochem SA, Switzerland) and 10 g of glass fibers (fiber length 3 mm) surface treated with methacrylsilane and aminosilane were mixed The mixture was compounded twice in a twin screw extruder at a temperature of 220° C. and a screw speed of 30 rpm. The extrudate was finally pelletised. The composition gave not rise to any processing problems during extrusion or pelletising.

EXAMPLE 22

The compositions of Examples 19–21 were injection moulded in accordance with Example 10 to form specimens of the dimensions 51×51×4 mm and the yield strength and chappy impact strength of the specimens thus produced were determined.

3-Point-bending tests were performed on a UTS apparatus equipped with a 1 kN load cell for determination of the yield strength. Ten tests were carried out on each composition and below given figures are an average of said ten tests.

Notched chappy impact tests were carried out on a standard chappy testing apparatus (Karl Frank GmbH, type 53565) having a 0.5 J pendulum. Ten tests were carried out on each composition and below given figures are an average of said ten tests.

| Composition acc. to | Result Yield Strength (MPa) | Chappy Impact Strength (kJ/m$^2$) |
|---|---|---|
| Example 19 | 36.8 | 3.49 |
| Example 20 | 31.7 | 2.75 |
| Example 21 | 22.1 | 2.73 |

The yield strength and the chappy impact strength of compositions according to Example 19 are increased or even substantially increased compared to Examples 20 and 21 (comparative examples). The yield and impact strength of a polypropylene/short fiber composite is substantially improved by a thermoplastic compound according to the present invention in comparison to unmodified and maleic anhydride modified polypropylene.

EXAMPLE 23

A third generation hyperbranched dendritic polyester macromolecule was prepared by adding a third generation to the product of Example 1.

600.0g of a Obtained second generation hyperbranched dendritic macromolecule according to Example 1, 717.0 g (5.35 moles) of 2,2-dimethylolpropionic acid and 0.7 g (0.007 mole) of $H_2SO_4$ (96%-w/w) were charged in a 4-necked reaction flask equipped with stirrer, pressure gauge, cooler and receiver. The temperature was raised to 120° C, at which temperature 2,2-dimethylolpropionic acid began to melt and esterification water was formed. The temperature was thereafter during 20 minutes raised to 140° C., giving a transparent solution, whereby a vacuum of 30–50 mm Hg was applied. The reaction was now under stirring allowed to continue for 5 hours giving a final acid value of ≈10 mg KOH/g.

Obtained third generation hyperbranched dendritic macromolecule exhibited the following properties:

| | |
|---|---|
| Acid value, mg KOH/g: | 10.6 |
| Hydroxyl value, mg KOH/g: | 493 |
| Molecular weight, g/mole: | 3311 |

EXAMPLE 24

Chain termination of the third generation hyperbranched dendritic polyester macromolecule obtained according to Example 23.

362.64 g of the hyperbranched dendritic macromolecule of Example 23, 562.95 g of 10-undecenoic acid (Elf Atochem, France) and 46 g of xylene were charged in a 4-necked reaction flask equipped with stirrer, Dean-Stark separator, nitrogen inlet and cooler. The temperature was during 250 minutes raised to 185° C. Reaction water began to evaporate azeotropically at 166° C. The reaction mixture was kept at 185° C. temperature until an acid value of 13.1 mg KOH/g was reached.

Obtained chain terminated hyperbranched dendritic macromolecule exhibited the following properties:

| | |
|---|---|
| Acid value, mg KOH/g: | 13.1 |
| Molecular weight, g/mole: | ≈7000 |
| Viscosity, Brookfield, 23° C., mPas: | 5930 |

EXAMPLE 25

Functionalization of the chain terminated hyperbranched dendritic macromolecule obtained according to Example 24, whereby functionalization provides epoxide groups and whereby oxidation is performed by means of peroxy acid form in situ from acid and peroxide.

207.28 g of the product according to Example 24, 134.73 g of xylene and 8.29 g of a cationic ion-exchanger were charged in a 4-necked reaction flask equipped with stirrer, drop funnel, nitrogen inlet and cooler. The solution was heated to 60° C. at which temperature 31.77 g of acetic acid was charged followed by gradual addition during 15 minutes of 71.97 g of hydrogen peroxide (50% aq.). The reaction was allowed to continue for a further 11 hours, after which time the ion-exchanger was removed from the reaction solution by filtration. The filtrate was now centrifuged to separate the water phase from the organic phase. After removing the water phase containing excess peroxide and acetic acid, the organic phase was extracted with water 3 times followed by centrifugation. The final product was recovered by removing the solvent by means of a roll evaporator. A clear yellowish low viscous liquid was obtained.

Obtained functionalized chain terminated hyperbranched dendritic macromolecule exhibited the following properties:

| | |
|---|---|
| Epoxy equivalent weight, g/eq | 380 |
| Molecular weight, g/mole | 8663 |
| Acid value, mg KOH/g | 8.2 |
| Non-volatile content, % | 98.1 |
| Viscosity, Brookfield, 23° C., mPas | 6900 |

EXAMPLE 26

Comparison of Theological behaviour between pure polypropylene, a blend comprising polypropylene and maleic anhydride grafted polypropylene (Blend 1) and a blend comprising polypropylene, maleic anhydride grafted polypropylene and small amounts of the functionalized chain terminated hyperbranched dendritic macromolecule of Example 25 (Blend 2).

All materials and blends were processed in the same manner, that is compounded and pelletised according to the procedure described in Example 2.

Blend 1: 95%-w/w of polypropylene (Appryl 3050 MN1, Elf Atochem SA, Switzerland) and 5%-w/w of maleic anhydride grafted polypropylene (PP-ML, Elf Atochem SA, Switzerland) were mixed, compounded and pelletised.

Blend 2: 94.4%-w/w of polypropylene (Appryl 3050 MN1, Elf Atochem SA, Switzerland), 5%-w/w of maleic anhydride grafted polypropylene (PP-ML, Elf Atochem SA, Switzerland) and 0.06%-w/w of the product according to Example 1 mixed, compounded and pelletised.

Zero-shear viscosity was thereafter recorded for the three materials—Pure polypropylene (PP), Blend 1 and Blend 2—by means of applying a pellet of respective sample between two parallel plates of a rotational dynamic analyser (Rheometrics, RDA) machine and then increase the sample temperature to 220° C. and record the viscosity/shear rate/shear stress interdependence at the frequency interval 1–0.01 rad/second. The zero-shear rate viscosity could then be derived from Carreau's equation as shown in Equation 1 below:

$$\tau(\gamma)=\eta_1\gamma=\eta_0\times\gamma[1+(\lambda\gamma)^2]^{n-\frac{1}{2}}$$ (Equation 1)

wherein $\tau$ is the shear stress, $\eta_1$ is the measured viscosity, $\gamma$ is the shear rates $\eta_0$ is the zero-shear rate viscosity, $\lambda$ is a time constant which determines the onset of the non-linear regime and n is the power law.

The obtained results are given in Graph 1 below:

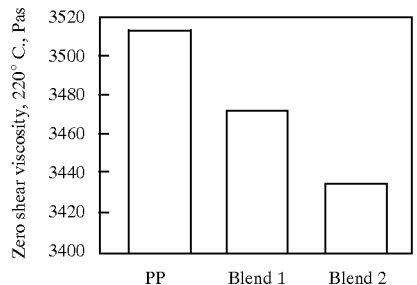

Graph 1: Effect of Theological behaviour for polypropylene blend grafted with hyperbranched dendritic polyester moiety as opposed to pure polypropylene As seen from Graph 1 above, a very small amount of dendritic polyester (0.06%-w/w) according to Example 1 which in situ is reacted with maleic anhydride grafted polypropylene has significant impact on the rheological behaviour of a thermoplastic blend such as the one described above. Example 26 thereby illustrates the benefits in decreased processing viscosity which is directly transferable to improved processing properties of a thermoplastic blend or a composite. Improved processing properties is of utter importance for the industry in order to increase productivity of thermoplastic products.

EXAMPLE 27

The reduction in interfacial tension between polypropylene and polyamide phases when employing blends containing interfacial promoters according to the present invention based on a maleic anhydride grafted polypropylene which has been bonded to an either hydroxyl or epoxy functional dendritic polyesters according to Examples 1 and 25 is studied.

All materials and blends were processed in the same manner, that is mixed, compounded and extruded using processing conditions similar to those disclosed in Example 2.

Blend 1: 95%-w/w of polypropylene (Appryl 3050 MN1, Elf Atochem SA, Switzerland) and 5%-w/w of maleic anhydride functional polypropylene (PP-ML, Elf Atochem) were mixed, compounded and extruded.

Blend 2: 94.94%-w/w of polypropylene (Appryl 3050 MN1, Elf Atochem SA, Switzerland), 5%-w/w of maleic anhydride grafted polypropylene (PP-ML, Elf Atochem) and 0.06%-w/w of the product according to Example 1 were mixed, compounded and extruded.

Blend 3: 94.85%-w/w of polypropylene (Appryl 3050 MN1, Elf Atochem SA, Switzerland), 5%-w/w of maleic anhydride grafted polypropylene (PP-ML, Elf Atochem) and 0.15%-w/w of the product according to Example 25 were mixed, compounded and extruded.

Blend 4: 69.28%-w/w of polypropylene (Appryl 3050 MN1, Elf Atochem SA, Switzerland), 30%-w/w of maleic anhydride grafted polypropylene (PP-ML, Elf Atochem) and 0.72%-w/w of the product according to Example 1 were mixed, compounded and extruded.

Blend 5: 69.1%-w/w of polypropylene (Appryl 3050 MN1, Elf Atochem SA, Switzerland), 30 %-w/w of maleic anhydride grafted polypropylene (PP-ML, Elf Atochem) and 0.9%-w/w of the product according to Example 25 were mixed, compounded and extruded.

The obtained extrudates of pure polypropylene and the 5 different blends were pressed into 0.5 mm thick films. Particles of polyamide (Orgamide RMNO, Elf Atochem SA, Switzerland) were thereafter placed between two sheets of films of respective sample and pressed to 0.7 mm thick films. The polyamide containing films were then cut with dimensions 5×5 mm$^2$ and placed between two microscope glass slides. The sample containing glass slides were inserted into metal guides which were placed in a hot stage under an optical microscope equipped with an 8-bit CCD camera. The samples were then in the hot stage heated to 220° C., at which the polyamide samples melted. The embedded polyamide particles established a spherical shape due to the surface tension. By displacement of the upper glass slide, a shear force could be applied which resulted in an ellipsoid shaped drop that after a certain relaxation time retained it's spherical shape. The time for recovery from an ellipsoid shape to an spherical shape is directly related to the interfacial surface tension (A. Luciano, presently unpublished but accepted by J. Polymer Sci. for publication 1997) between the polyamide phase (the drop) and the surrounding polyolefine matrix (the surrounding films) through Equation 2 and Equation 3.

$$\tau = \eta_{eq} R_0 / \upsilon \quad \text{(Equation 2)}$$

wherein $\tau$ is the relaxation time, $\upsilon$ is the interfacial tension coefficient and $\eta_{eq}$ is the equivalent viscosity according to Equation 3

$$\eta_{eq} = \eta_m (2\lambda + 3)(19\lambda + 16)/(40(\lambda + 1)) \quad \text{(Equation 3)}$$

and $\lambda = \eta_d / \eta_m$ wherein $\eta_d$ and $\eta_m$ is the zero shear viscosity of the drop and the matrix respectively.

Measurements and calculations were made according to above and obtained results are given in Graph 2 below:

The obtained result shows a drastic reduction in interfacial tension in cases when interface promoters according to the present invention are used. A value of below 1 was obtained for blend 5, which indicates very strong covalent bonds between the polyamide and the polyolefine blend. A drastically reduced interfacial tension means drastically improved interfacial properties between materials which normally not are possible to adhere to each other.

EXAMPLE 28

Bonding between a maleic anhydride grafted polypropylene and the epoxy functional product according to Example 25.

The extent of reaction between a maleic anhydride grafted polypropylene (PP-ML, Elf Atochem SA, Switzerland) and the product according to Example 25 was studied by recording the viscosity increase as a function of time in a rotational dynamic analyser (RDA, Rheometrics). Two samples were studied, one being maleic anhydride grafted polypropylene and the other being a blend comprising 97%-w/w of maleic anhydride grafted polypropylene and 3%-w/w of the hyperbranched dendritic macromolecule of Example 25. The latter was mixed, compounded and pelletizer according to Example 2.

A small amount of respective sample was applied between parallel plates of the RDA and then heated to steady state at 220° C. Viscosity as a function of time was thereafter recorded at a shear rate of 0.01 s$^{-1}$. Obtained results are given in Graph 3 below.

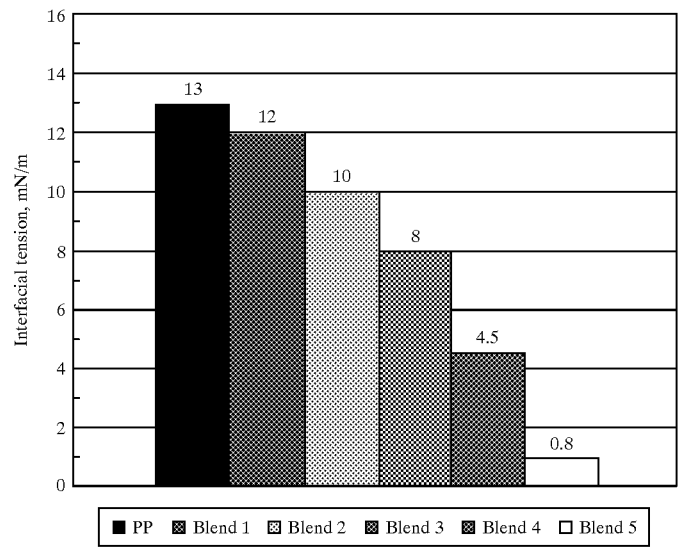

Graph 2: Interfacial tension between polyamide and polypropylene blends containing maleic anhydride grafted polypropylene bonded to both a hydroxyl functional dendritic polyester and an epoxy functional dendritic polyester.

Graph 3: Estimation of extent of reaction between maleic anhydride grafted polypropylene and dendritic epoxy functional polyester according to example 25.

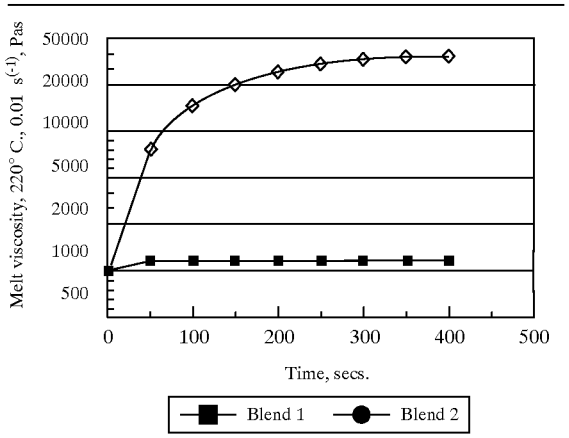

Above graph illustrates the rapid bonding between a maleic anhydride grafted polypropylene and the hyperbranched dendritic epoxy functional polyester according to Example 25. The viscosity increase as a function of time is directly related to an increase in molecular weight of resulting interface promoter. A similar behaviour as illustrated above is of course expected for hydroxyl functional dendritic polyesters and the like.

EXAMPLE 29

The effect on tensile strength and residual strength after cracking for a glass mat thermoforming (GMT) material.

Elf Atochem) and 3%-w/w of the product according to Example 1 were mixed, compounded and pelletised according to the procedure described in Example 2.

Said blends were in a first step compression moulded into sheets of the dimension 150×150 mm and in a second step said moulded sheets were laid in sandwich layers between sheets of glass mat (5 mm random fibers, stitched fiber mat) of the same dimensions according to below illustration.

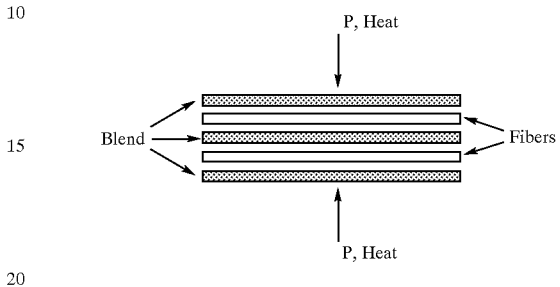

The GMT sandwich structure was then compression moulded (Schwabenthan) for 4 minutes at 220° C. and 3 bar. Obtained material was now cut into four equally sized sheets which were placed on top of each other and then compression moulded for 4 minutes at 210° C. and 3 bar. A last compression mould step was then performed for 1 minute at 70° C. and 80 bar finalising fabrication of the GMT material.

Obtained GMT material was conditioned at room temperature for 2 days before testing in a 3-point bending test (the procedure is in detail described in Example 22). The mechanical properties tested were tensile modulus, tensile strength and residual strength after cracking had occurred.

Obtained results are given in graph 4 below:

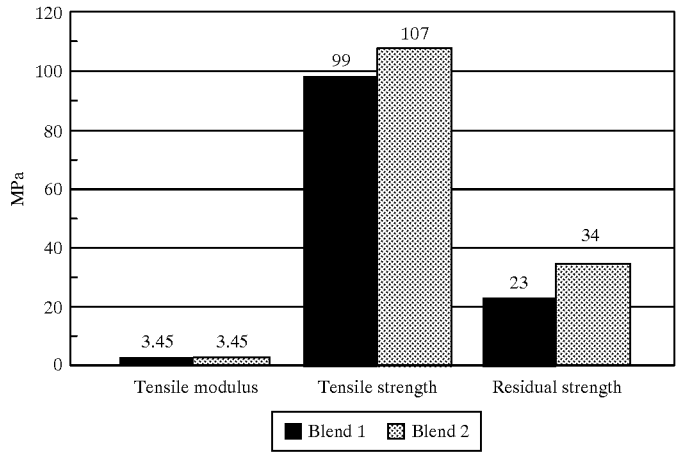

Graph 4: Improvement of properties in a GMT material for claimed invention

Two polypropylene blends Were prepared.

Blend 1: 97.3%-w/w of polypropylene co-polymer (EPL 31UA, Montel) and 2.7%-w/w of a maleic anhydride grafted polypropylene (PP-ML, Elf Atochem SA, Switzerland) were mixed, compounded and pelletised according to the procedure described in Example 2.

Blend 2: 97.3%-w/w of polypropylene co-polymer (EPL 31UA, Montel) and 2.7%-w/w of a blend containing 97%-w/w of a maleic anhydride grafted polypropylene (PP-ML, As seen from the graph above, both the tensile strength and the residual strength after cracking are significantly improved when a blend (Blend 2) containing a hyperbranched dendritic polyester compounded with polypropylene chains are employed as opposed to only using blends containing maleic anhydride grafted polypropylene (Blend 1).

EXAMPLE 30

Interfacial properties between polypropylene blends and poly(methylmetacrylate). Two blends were prepared.

Blend 1: 95%-w/w of polypropylene (Appryl 3050 MN1, Elf Atochem SA, Switzerland) and 5%-w/w of maleic grafted polypropylene (PP-ML, Elf Atochem SA, Switzerland) were mixed, compounded and pelletised according to the procedure described in Example 2.

Blend 2: 95%-w/w of polypropylene (Appryl 3050 MN1, Elf Atochem SA, Switzerland) and 5%-w/w of a blend comprising 97%-w/w of maleic grafted polypropylene (PP-ML, Elf Atochem) and 3%-w/w of the product according to Example 25 were mixed, compounded and pelletised according to the procedure described in Example 2.

Particles of each blend were placed between two plates of poly(methylmetacrylate) and the interfacial tension was recorded in same manner as described in Example 27.

Obtained results are given in Graph 5 below:

Graph 5: Drop in interfacial tension when a blend containing a thermoplastic compound according to the present invention is employed

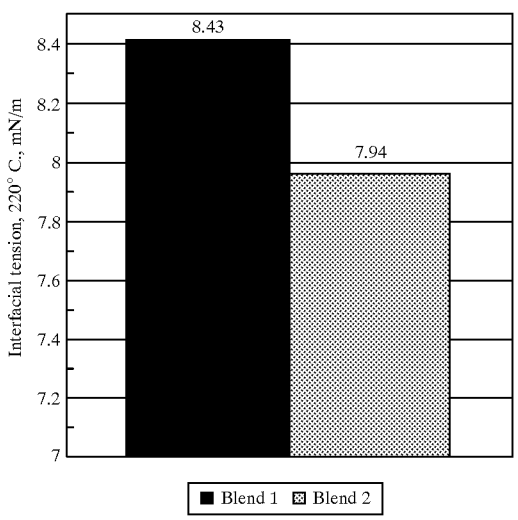

Above result illustrates the applicability of the present invention in reducing the interfacial tension between polypropylene blends and other more polar substrates which is this case is the widely used amorphous thermoplastic poly(methylmetacrylate).

EXAMPLE 31

Adhesion between a polypropylene blend without and with a polypropylene compounded with a hyperbranched dendritic polyester. Two blends were prepared.

Blend 1: 44.5%-w/w of polypropylene (Appryl 3050 MN1, Elf Atochem SA, Switzerland) and 55.5%-w/w of a maleic anhydride grafted polypropylene with 0.46%-w/w maleic anhydride were mixed, compounded and pelletised according to the procedure described in Example 2.

Blend 2: 44.5%-w/w of polypropylene (Appryl 3050 MN1, Elf Atochem SA, Switzerland) and 55.5%-w/w of a blend comprising a maleic anhydride grafted polypropylene with 0.46%-w/w maleic anhydride and the product according to Example 1 at a molar ratio 2:1, were mixed, compounded and pelletised according to the procedure described in Example 2.

In a second step the blends were moulded into 50×50 mm plaques in a Butler mini injection unit. Obtained plaques were then compression moulded onto surface treated glass plates in an Interlaken hydraulic press during 10 minutes at 200° C. with a force of 5 kN.

Surface Treatment of Glass Plates

A silane, A-1100 (OSI) was applied by immersing the clean glass plates in an aqueous bath with 1.5% of silane for 1 hrs, followed by drying in an oven at 80° C. until the treated glass plates did not hold any water.

Blend 1: Some adhesion between the glass and the polymer plaques but the glass plates could be detached by hand from the polymer plaques.

Blend 2: Very strong adhesion between the glass and the polymer plaques making it impossible to detach the polymer plaque from the glass by hand. A cohesive failure within the glass plates occurred when mechanically loading the interface.

Above results show the applicability of the present invention as interface promoter between glass and polypropylene. Although not shown here it is rendered suitable to use above described principle to apply the interface promoter according to said invention to glass fibers and hence get effective surface treatment of glass fibers that should be very effective in thermoplastic composites such as GMT materials.

EXAMPLE 32

Reaction between partially degraded polypropylene containing reactive groups such as R—COOH and a hydroxy-functional hyperbranched dendritic polyester according to Example 23.

A particle of the product according to Example 23 was applied between two plates of polypropylene according to the procedure described in Example 27.

The interfacial tension was recorded as a function of contact time between the two phases. Obtained results are shown in graph 6 below:

Graph 6: Reduction in interfacial tension due to reaction between hydroxy functional hyperbranched dendritic polyester and partially degraded polypropylene

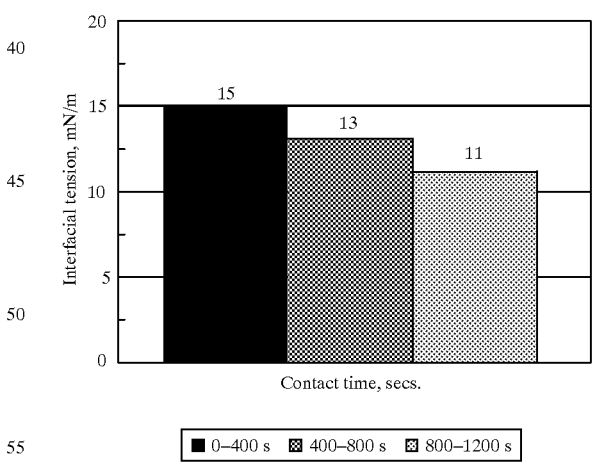

Above results illustrate the bonding reaction between hydroxyl functional hyperbranched dendritic polyesters and partially degraded polypropylene. Due to the sample temperature (220° C.) there is some degradation and high temperature in combination with air should lead to chain scission and some incorporation of reactive groups onto the scissored polypropylene. These can then react with available hydroxyl groups on the dendritic polyester thereby lowering the interfacial tension between the two phases and hence increasing the affinity.

EXAMPLE 33

Critical strain energy release rate in compression moulded plaques of a polypropylene blend containing a thermoplastic composition according to the present invention and a polyamide plaque. Two blends were prepared.

Blend 1: 90%-w/w of a maleic anhydride containing polypropylene blend (Orevac PP-C, Elf Atochem SA, Switzerland) and 10%-w/w of polyamide 6 (Orgamide Resno, Elf Atochem SA, Switzerland) were mixed, compounded and pelletised according to the procedure described in Example 7.

Blend 2: 90%-w/w of a blend containing 99.77%-w/w of a maleic anhydride containing polypropylene blend (Orevac PP-C, Atochem SA, Switzerland), 0.23%-w/w of the product according to Example 1 and 10%-w/w of polyamide 6 (Orgamide Resno, Elf Atochem) were mixed, compounded and pelletised according to the procedure described in Example 7.

The critical strain energy release rate ($G_{1C}$) was determined for the two blends according to the procedure described in Example 12. Obtained results are shown in Graph 7 below:

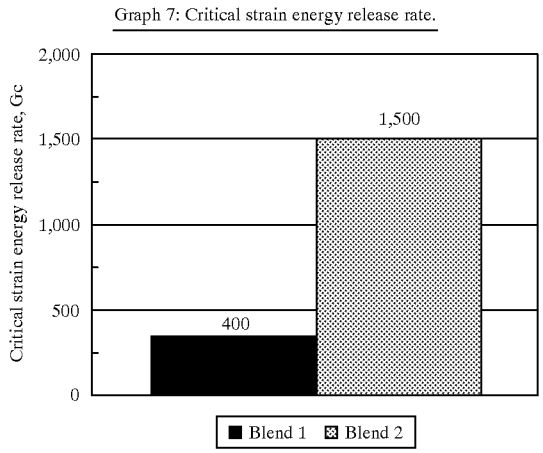

Graph 7: Critical strain energy release rate.

As seen from the graph above, a drastic improvement in bond strength (375%) is seen when very small amounts of a thermoplastic composition according to the invention are employed. The low amounts necessary to give significant improvement give a negligible impact on cost and the price performance of industrially applicable materials is thus very favourable.

What is claimed is:

1. A thermoplastic compound comprising at least one linear or branched thermoplastic polymer or copolymer having at least one reactive or graftable site ($F_1$), which polymer or copolymer is compounded with at least one hyperbranched dendritic macromolecule, said hyperbranched dendritic macromolecule composed of a monomeric or polymeric nucleus having at least one reactive epoxide, hydroxyl, carboxyl or anhydride group to which nucleus is added 1–100 branching generations comprising at least one monomeric or polymeric branching chain extender having at least three reactive groups of which at least one is a hydroxyl group and at least one is a carboxyl or anhydride group and, optionally, at least one spacing generation comprising at least one spacing chain extender, said spacing chain extender having two reactive groups of which one is a hydroxyl group and one is a carboxyl or anhydride group or said spacing chain extender is an inner ether thereof, said hyperbranched dendritic macromolecule having terminal chain extender functionality provided by hydroxyl, carboxyl or anhydride groups, said hyperbranched dendritic macromolecule optionally completely or partially chain terminated by at least one monomeric or polymeric chain stopper and functionalized, whereby said hyperbranched dendritic macromolecule through said terminal chain extender functionalization, said optional chain termination or said functionalization has at least one reactive or graftable site ($F_2$) being reactive to or graftable onto said reactive or graftable site ($F_1$).

2. A thermoplastic compound according to claim 1 wherein said reactive or graftable site ($F_1$) is a reactive site selected from the group consisting of a hydroxyl, an epoxide, a carboxyl, an anhydride, an amine, an amide, a cyano, a sulfonate, a halide, an ester and an alkenyl group.

3. A thermoplastic compound according to claim 1 wherein said reactive or graftable site ($F_1$) is an abstractable hydrogen.

4. A thermoplastic compound according to claim 1 wherein said reactive or graftable site ($F_2$) is a reactive site selected from the group consisting of a hydroxyl, an epoxide, a carboxyl, an anhydride, an amine, an amide, an imide, a cyano, a sulfonate, a halide, an ester and an alkenyl group.

5. A thermoplastic compound according to claim 1 wherein the thermoplastic polymer or copolymer is a thermoplastic graft polymer or copolymer composed of at least one unsaturated monomer grafted onto a thermoplastic polymer or copolymer whereby said polymer or copolymer is provided with at least one reactive functional site ($F_1$).

6. A thermoplastic compound according to claim 5 wherein the unsaturated monomer is a compound having at least one C=C bond and at least one reactive hydroxyl, epoxide, carboxyl, anhydride, amine, amide, imide, cyano or sulfonate group.

7. A thermoplastic compound according to claim 6 wherein the unsaturated monomer is acrylic acid, methacrylic acid, crotonic acid, maleic anhydride, fumaric acid, hydroxyalkylacrylate, hydroxyalkylmethacrylate or acrylonitrile.

8. A thermoplastic compound according to claim 1 wherein said thermoplastic polymer is selected from the group consisting of:

(i) a polyalkylene;
(ii) a poly(alkylene oxide);
(iii) a poly(oxyalkylene);
(iv) a poly(haloalkylene);
(v) a poly(alkylene phthalate or terephthalate);
(vi) a poly(phenyl or phenylene);
(vii) a poly(phenylene oxide or sulfide);
(viii) a poly(vinyl acetate);
(ix) a poly(vinyl alcohol);
(x) a poly(vinyl halide);
(xi) a poly(vinylidene halide);
(xii) a poly(vinyl nitrile);
(xiii) a polyamide;
(xiv) a polyimide;
(xv) a polycarbonate;
(xvi) a polysiloxane;
(xvii) a poly(acrylic or methacrylic acid);
(xvii) a poly(acrylate or methacrylate);

(xix) a natural polymer; and (xx) a synthetic polymer.

9. A thermoplastic compound according to claim 1 wherein said thermoplastic copolymer comprises at least one monomer identical to at least one monomer included in at least one thermoplastic polymer selected from the group consisting of:

(i) a polyalkylene;

(ii) a poly(alkylene oxide);

(iii) a poly(oxyalkylene);

(iv) a poly(haloalkylene);

(v) a poly(alkylene phthalate or terephthalate);

(vi) a poly(phenyl or phenylene);

(vii) a poly(phenylene oxide or sulfide);

(viii) a poly(vinyl acetate);

(ix) a poly(vinyl alcohol);

(x) a poly(vinyl halide);

(xi) a poly(vinylidene halide);

(xii) a poly(vinyl nitrile);

(xiii) a polyamide;

(xiv) a polyimide;

(xv) a polycarbonate;

(xvi) a polysiloxane;

(xvii) a poly(acrylic or methacrylic acid);

(xvii) a poly(acrylate or methacrylate);

(xix) a natural polymer, and (xx) a synthetic polymer.

10. A thermoplastic compound according to claim 1 wherein said thermoplastic polymer or copolymer is cellulose acetate, cellulose propionate, cellulose acetate butyrate, cellulose acetate propionate, carboxymethyl cellulose, cellulose nitrate, alkylcellulose, polyamide, polybutylene, poly(butylene terephthalate), polyethylene, poly(ethylene oxide), poly(chlorotriflouro ethylene), poly(diallyl phthalate), poly(ethylene terephthalate), polyisobutylene, poly(methyl methacrylate), poly(4-methyl pentylene), poly(oxymethylene), polypropylene, poly(propylene oxide), poly(phenylene sulfone), polystyrene, poly(tetrafluoro ethylene), poly(vinyl acetate), poly(vinyl alcohol), poly(vinyl butyral), poly(vinyl chloride), poly(vinylidene chloride), poly(vinylidene fluoride), poly(vinyl fluoride), poly(vinyl formal), poly(vinyl carbazole), poly(vinyl pyrrolidone), poly(acrylonitrile butadiene styrene), poly(acrylonitrile methylmethacrylate), poly(acrylonitrile styrene acrylate), poly(ethylene ethylacrylate), poly(ethylene propylene), poly(ethylene vinyl acetate), poly(tetrafluroethylene hexafluoropropylene), poly(styrene butadiene), poly(styrene-α-methylstyrene), poly(vinyl chloride ethylene), poly(vinyl chloride ethylene methacrylate), poly(vinyl chloride methyl acrylate), poly(vinyl chloride vinyl acetate), poly(vinyl chloride vinylidene chloride) and/or poly(diallyl isophthalate).

11. A thermoplastic compound according to claim 1 wherein the thermoplastic polymer or copolymer of the thermoplastic compound has a molecular weight of 500–500,000.

12. A thermoplastic compound according to claim 1 wherein the nucleus of the hyperbranched dentritic macromolecule is a mono, di, tri or polyfunctional alcohol.

13. A thermoplastic compound according to claim 1 wherein the nucleus of the hyperbranched dendritic macromolecule is a reaction product of a mono, di, tri or polyfunctional alcohol and an alkylene oxide.

14. A thermoplastic compound according to claim 12 wherein the di, tri or polyfunctional alcohol is 5-ethyl-5-hydroxymethyl-1,3-dioxane, 5,5-dihydroxymethyl-1,3-dioxane, ethylene glycol, diethylene glycol, triethylene glycol, propylene glycol, dipropylene glycol, pentanediol, neopentyl glycol, 1,3-propanediol, 2-methyl-2-propyl-1,3-propanediol, 2-ethyl-2-butyl-1,3-propanediol, cyclohexanedimethanol, trimethylolpropane, trimethylolethane, glycerol, erythritol, anhydroenneaheptitol, ditrimethylolpropane, ditrimethylolethane, pentaerythritol, methyl-glucoside, dipentaerythritol, tripentaerythritol, glucose, sorbitol, ethoxylated triemthylolethane, propoxylated trimethylolethane, ethoxylated trimethylolpropane, propoxylated trimethylolpropane, ethoxylated pentaerythritol or propoxylated pentaerythritol.

15. A thermoplastic compound according to claim 1 wherein the nucleus of the hyperbranched dentritic macromolecule is a mono, di, tri or polyfunctional epoxide.

16. A thermoplastic compound according to claim 15 wherein the epoxide is selected from the group consisting of (i) a glycidyl ester of a monofunctional carboxylic acid having 1–24 carbon atoms, (ii) a glycidyl ether of a monofunctional alcohol having 1–24 carbon atoms, (iii) a glycidyl ether of di, tri or polyfunctional alcohol, (iv) a mono, di or triglycidyl substituted isocyanurate, (v) a glycidyl ether of a condensation product between at least one phenol and at least one aldehyde or an oligomer of such a condensation product, (vi) a glycidyl ether of a condensation product between at least one phenol and at least one ketone or an oligomer of such a condensation product, and (vii) a glycidyl ether of a reaction product between at least one mono, di, tri or polyfuncational alcohol and ethylene, propylene, butylene and/or phenylethylene oxide.

17. A thermoplastic compound according to claim 1 wherein the nucleus of the hyperbranched dendritic macromolecule is selected from the ground consisting of i) a mono, di, tri or polyfunctional saturated carboxylic acid or an anhydride, ii) a mono, di, tri or polyfuncational unsaturated carboxylic acid or anhydride, iii) a carboxyfunctional adduct of a mono, di, tri or polyfunctional saturated carboxylic acid or anhydride, and iv) A carboxyfuncational adduct of a mono, di, tri, or polyfunctional unsaturated carboxylic acid or anhydride.

18. A thermoplastic compound according to claim 10 wherein the nucleus of the hyperbranched dendritic macromolecule is a hydroxyfunctional carboxylic acid or anhydride.

19. A thermoplastic compound according to claim 10 wherein the hydroxyfunctional carboxylic acid or anhydride is selected from the group consisting of 2,2-dimethylolpropionic acid, α,α-bis(hydroxymethyl)butyric acid, α,α,α-tris(hydroxymethyl)acetic acid, α,α-bis(hydroxymethyl)valeric acid, α,α-bis(hydroxy)propionic acid, 3,5-dihydroxybenzoic acid and α,β-dihydroxypropionic acid.

20. A thermoplastic compound according to claim 1 wherein the branching chain extender of the hyperbranched dendritic macromolecule is selected from the group consisting of (i) an aliphatic di, tri or polyhydroxyfunctional saturated or unsaturated monofunctional carboxylic acid or anhydride, (ii) a cycloaliphatic di, tri or polyhydroxyfunctional saturated or unsaturated mono functional carboxylic acid or anhydride, (iii) an aromatic di, tri or polyhydroxyfunctional monofunctional carboxylic acid or anhydride, (iv) an aliphatic monohydroxyfunctional saturated or unsaturated di, tri or polyfunctional carboxylic acid or anhydride, (v) a cycloaliphatic monohydroxyfunctional saturated or unsaturated di, tri or polyfunctional carboxylic acid or anhydride, (vi) an aromatic monohydroxyfunctional di, tri or polyfunctional carboxylic acid or anhydride, and (vii) an ester prepared from two or more of said hydroxyfunctional carboxylic acids or anhydrides.

21. A thermoplastic compound according to claim 20 wherein the branching chain extender is 2,2-dimethylolpropionic acid, α,α,-bis(hydroxymethyl)butyric acid, α,α,α,-tris(hydroxymethyl)acetic acid, α,α,-bis(hydroxymethyl)valeric acid, α,α,-bis(hydroxy)propionic acid, 3,5-dihydroxybenzoic acid, α,β,-dihydroxypropionic acid, heptonic acid, citric acid, d- or l-tartaric acid, dihydroxymaloic acid and/or d-gluconic acid.

22. A thermoplastic compound according to claim 1 wherein the optional spacing chain extender of the hyperbranched dendritic macromolecule is an aliphatic, cycloaliphatic or aromatic monohydroxyfunctional monocarboxylic acid or anhydride or an inner ether of said acid.

23. A thermoplastic compound according to claim 22 wherein the optional spacing chain extender is selected from the group consisting of hydroxyacetic acid, hydroxyvaleric acid, hydroxypropionic acid, hydroxypivalic acid, glycolide, δ-valerolactone, β-propiolactone and ε-caprolactone.

24. A thermoplastic compound according to claim 1 wherein the optional chain termination of the hyperbranched dendritic macromolecule is performed by means of at least one chain stopper selected from the group consisting of (i) an aliphatic or cycloaliphatic saturated or unsaturated monofunctional carboxylic acid or anhydride having 1–24 carbon atoms, (ii) an aromatic monofunctional carboxylic acid or anhydride, (iii) a diisocyanate, an oligomer or an adduct thereof, (iv) a glycidyl ester of a monofunctional carboxylic acid or anhydride having 1–24 carbon atoms, (v) a glycidyl ether of a monofunctional alcohol having 1–24 carbon atoms, (vi) an adduct of an aliphatic or cycloaliphatic saturated or unsaturated mono, di, tri or polyfunctional carboxylic acid or anhydride having 1–24 carbon atoms, (vii) an adduct of an aromatic mono, di, tri or polyfunctional carboxylic acid or anhydride, (viii) an epoxide of an unsaturated monofunctional carboxylic acid or corresponding triglyceride, wherein said acid has 3–24 carbon atoms, (ix) an aliphatic or cycloaliphatic saturated or unsaturated monofunctional alcohol, (x) an aromatic monofunctional alcohol, (xi) an adduct of an aliphatic or cycloaliphatic saturated or unsaturated mono, di, tri or polyfunctional alcohol and (xii) an adduct of an aromatic mono, di, tri or polyfunctional alcohol.

25. A thermoplastic compound according to claim 24 wherein the chain stopper is formic acid, acetic acid, propionic acid, butanoic acid, hexanoic acid, acrylic acid, methacrylic acid, crotonic acid, lauric acid, linseed fatty acid, soybean fatty acid, tall oil fatty acid, dehydrated castor fatty acid, capric acid, caprylic acid, benzoic acid, behenic acid, montanoic acid, p-tert.butylbenzoic acid, abietic acid, sorbic acid, 1-chloro-2,3-epoxypropane, 1,4-dichloro-2,3-epoxybutane, epoxidized soybean fatty acid, trimethylolpropane diallyl ether maleate, 5-methyl-5-hydroxymethyl- 1,3-dioxane, 5-ethyl-5-hydroxymethyl- 1,3-dioxane, glycerol dially ether, trimethylolpropane diallyl ether, pentaerythritol triallyl ether, pentaerythritol triacrylate, pentaerythritol triethoxylate triacrylate, phenyl isocyanate, toluene-2,4-diisocyanate, toluene-2,6-diisocyanate, hexamethylene diisocyanate and/or isophorone diisocyanate.

26. A thermoplastic compound according to claim 1 wherein the reactive or graftable site ($F_2$) is obtained through functionalization of the hyperbranched dendritic macromolecule or its optional chain termination.

27. A thermoplastic compound according to claim 26 wherein said functionalization is an addition, an oxidation, an epoxidation, an allylation or a combination thereof.

28. A thermoplastic compound according to claim 27 wherein the functionalization is epoxidation performed using an eiphalohydrin.

29. A thermoplastic compound according to claim 27 wherein the functionalization is allylation performed using an allyl halide.

30. A thermoplastic compound according to claim 27 wherein the functionalization is performed using an acrylonitrile yielding at least one cyano group.

31. A thermoplastic compound according to claim 27 wherein the functionalization is performed by addition of at least one unsaturated anhydride to a nucleophilic end group in the dendritic hyperbranched macromolecule and/or its optional chain termination.

32. A thermoplastic compound according to claim 27 wherein said functionalization is performed by Michael addition of at least one unsaturation within the hyperbranched dendritic macromolecule or its optional chain termination.

33. A thermoplastic compound according to claim 27 wherein said functionalization is oxidation performed using an oxidizing agent.

34. A thermoplastic compound according to claim 33 wherein the oxidizing agent is peroxyformic acid, peroxyacetic acid, peroxybenzoic acid, m-chloroperoxybenzoic acid, trifluoroperoxyacetic acid or mixtures thereof or therewith.

35. A thermoplastic compound according to claim 1 wherein said linear or branched thermoplastic polymer or copolymer is provided with at least one reactive functional site ($F_1$) being an anhydride group to which group said hyperbranched dendritic macromolecule provided with at least one reactive functional site ($F_2$) being a hydroxyl group is bonded by reaction between said reactive sites ($F_1$) and ($F_2$).

36. A thermoplastic compound according to claim 1 wherein the linear or branched thermoplastic polymer or copolymer is provided with at least one graftable site ($F_1$) onto which function at least one hyperbranched dendritic macromolecule provided with at least one reactive or graftable site ($F_2$) being an alkenyl group is grafted.

37. A thermoplastic composition comprising two or more components, whereby at least one component is the thermoplastic compound of claim 1.

38. A thermoplastic composition according to claim 37 wherein the thermoplastic compound is present in an amount of 0.001–75% by weight of said composition.

39. A thermoplastic composition of according to claim 37 wherein the thermoplastic composition in addition to said thermoplastic compound comprises at least one surface treated material.

40. A thermoplastic composition according to claim 39 wherein the surface treated material comprises glass fibers or glass particles.

41. A thermoplastic composition according to claim 39 wherein the surface treated material is surface treated with at least one silane.

42. A thermoplastic composition according to claim 37 wherein the composition in addition to said component or components comprises at least one thermoplastic polymer selected from the polymer group consisting of
   (i) polyalkylene;
   (ii) poly(alkylene oxide);
   (iii) poly(oxyalkylene);
   (iv) poly(haloalkylene);
   (v) poly(alkylene phthalate or terephthalate);
   (vi) poly(phenyl or phenylene);
   (vii) poly(phenylene oxide or sulfide);
   (viii) poly(vinyl acetate);
   (ix) poly(vinyl alcohol);
   (x) poly(vinyl halide);
   (xi) poly(vinylidene halide); (xii) poly(vinyl nitrile);
   (xiii) polyamide;
   (xiv) polyimide;
   (xv) polycarbonate;
   (xvi) polysiloxane;
   (xvii) poly(acrylic or methacrylic acid);
   (xvii) poly(acrylate or methacrylate);
   (xix) a natural polymer; and
   (xx) a synthetic polymer.

43. A thermoplastic composition according to claim 37 wherein the composition in addition to said component or components comprises at least one thermoplastic copolymer comprising at least one monomer identical to at least one monomer included in at least one polymer selected from the group consisting of
   (i) polyalkylene;
   (ii) poly(alkylene oxide);
   (iii) poly(oxyalkylene);
   (iv) poly(haloalkylene);
   (v) poly(alkylene phthalate or terephthalate);
   (vi) poly(phenyl or phenylene);
   (vii) poly(phenylene oxide or sulfide);
   (viii) poly(vinyl acetate);
   (ix) poly(vinyl alcohol);
   (x) poly(vinyl halide);
   (xi) poly(vinylidene halide);
   (xii) poly(vinyl nitrile);
   (xiii) polyamide;
   (xiv) polyimide;
   (xv) polycarbonate;
   (xvi) polysiloxane;
   (xvii) poly(acrylic or methacrylic acid);
   (xvii) poly(acrylate or methacrylate);
   (xix) a natural polymer; and
   (xx) a synthetic polymer.

44. A thermoplastic composition according to claim 37 wherein the composition comprises at least one pigment.

45. A thermoplastic composition according to claim 37 wherein the composition comprises at least one filling, modifying, reinforcing, fire retarding or lubricating additive.

46. A thermoplastic composition according to claim 37 wherein the composition comprises at least one mineral containing additive.

47. A thermoplastic composition according to any of the claims 37 wherein the composition comprises at least one additive selected from the group consisting of cellulose, glass particles, glass fibers, carbon or graphite fibers, aramid fibers, steel fibers and thermoplastic fibers.

48. A thermoplastic composition according to claim 37 wherein each thermoplastic component is present in the form of a powder, pellets, granules, rods, sheets or blocks.

49. A thermoplastic composition according to claim 37 wherein the components are mixed by means of a processing technique yielding a blend.

50. A thermoplastic composition according to claim 37 wherein the composition is a homogeneous material or a homogeneous blend in the form of a powder, pellets, granules, rods, sheets or blocks.

51. A thermoplastic article made of one or more thermoplastics wherein at least one of the thermoplastics is the thermoplastic compound of claim 1.

52. A thermoplastic article according to claim 51 wherein the thermoplastic article in addition to said thermoplastic compound comprises one or more linear or branched thermoplastic polymers or copolymers and/or one or more thermoplastic compositions comprising one or more linear or branched thermoplastic polymers or copolymers.

53. A thermoplastic article according to claim 52 wherein said additional thermoplastic polymer is selected from the group consisting of
   (i) polyalkylene;
   (ii) poly(alkylene oxide);
   (iii) poly(oxyalkylene);
   (iv) poly(haloalkylene);
   (v) poly(alkylene phthalate or terephthalate);
   (vi) poly(phenyl or phenylene);
   (vii) poly(phenylene oxide or sulfide);
   (viii) poly(vinyl acetate);
   (ix) poly(vinyl alcohol);
   (x) poly(vinyl halide);
   (xi) poly(vinylidene halide);
   (xii) poly(vinyl nitrile);
   (xiii) polyamide;
   (xiv) polyimide;
   (xv) polycarbonate;
   (xvi) polysiloxane;
   (xvii) poly(acrylic or methacrylic acid);
   (xvii) poly(acrylate or methacrylate);
   (xix) a natural polymer, and
   (xx) a synthetic polymer.

54. A thermoplastic article according to claim 52 wherein said additional copolymer comprises at least one monomer identical to at least one monomer included in at least one polymer selected from the group consisting of
   (i) polyalkylene,
   (ii) poly(alkylene oxide), (iii) poly(oxyalkylene),
(iv) poly(haloalkylene),
(v) poly(alkylene phthalate or terephthalate),
(vi) poly(phenyl or phenylene),
(vii) poly(phenylene oxide or sulfide),
(viii) poly(vinyl acetate),
(ix) poly(vinyl alcohol),
(x) poly(vinyl halide),
(xi) poly(vinylidene halide),
(xii) poly(vinyl nitrile),
(xiii) polyamide,
(xiv) polyimide,
(xv) polycarbonate,
(xvi) polysiloxane,
(xvii) poly(acrylic or methacrylic acid),
(xvii) poly(acrylate or methacrylate),
(xix) a natural polymer and
(xx) a synthetic polymer.

55. A thermoplastic article according to claim 51 wherein the thermoplastic article is reinforced with particles or fibers.

56. A thermoplastic article according to claim 55 wherein the particles or fibers are glass particles or fibers, said particles or fibers surface treated with at least one silane.

57. A thermoplastic article according to claim 51 wherein the thermoplastic article is laminated or sheet molded to yield a composite structure, in the form of an overlay, an underlay or an intermediate layer, with at least one metal, at least one cellulose based substrate or at least one thermosetting material or thermosetting composite material.

58. A thermoplastic article according to claim 57 wherein the thermoplastic article is laminated to a thermosetting material or thermosetting composite material which comprises at least one thermosetting resin selected from the group consisting of
 (i) a chain terminated hyperbranched dendritic macromolecule of the polyester type having at least one primary or secondary reactive site,
 (ii) a monomeric or polymeric epoxide,
 (iii) a rubber modified monomeric or polymeric epoxide,
 (iv) a hydroxyfunctional saturated or unsaturated ester,
 (v) a saturated or unsaturated polyester,
 (vi) a hydroxyfunctional saturated or unsaturated ester,
 (vii) a hydroxyfuncational saturated or unsaturated polyester,
 (viii) a polyamine or a polyamide,
 (ix) a bismaleimide,
 (x) a phenol-formaldehyde resin,
 (xi) a phenolic amino resin,
 (xii) a polyamide or polyetherimide,
 (xiii) a melamine-formaldehyde resin,
 (xiv) a urea-formaldehyde resin,
 (xv) an isocyanate, and
 (xvi) a urethane or a polyurethane having any of the functional groups —OH, —COOH or —NCO, said thermosetting resin optionally comprising at least one curing agent, catalyst, inhibitor or stabilizer.

59. A thermoplastic article according to claim 51 wherein the thermoplastic article is a semi-finished or finished article selected from the group consisting of
 (i) aeronautic goods and articles,
 (ii) nautic goods and articles,
 (iii) household goods and articles,
 (iv) interior and exterior building materials and articles,
 (v) automotive goods and articles,
 (vi) sporting goods and articles,
 (vii) leisure and commodity goods and articles and
 (viii) electric and electronic goods and articles.

60. A thermoplastic compound according to claim 1 wherein 1 to 20 branching generations are added to the nucleus.

61. A thermoplastic compound according to claim 60 wherein 2 to 8 branching generations are added to the nucleus.

62. A thermoplastic compound according to claim 1 wherein said inner ether is a lactone.

63. A thermoplastic compound according to claim 5 wherein said reactive functional site ($F_1$) is an end standing reactive site.

64. A thermoplastic compound according to claim 11 wherein said thermoplastic polymer or copolymer has a molecular weight of 1,000 to 100,000.

65. A thermoplastic compound according to claim 64 wherein said thermoplastic polymer or copolymer has a molecular weight of 5,000 to 50,000.

66. A thermoplastic compound according to claim 13 wherein said alkylene oxide is ethylene oxide, propylene oxide, butylene oxide or phenylethylene oxide.

67. A thermoplastic compound according to claim 22 wherein said inner either is a lactone.

68. A thermoplastic compound according to claim 28 wherein said epihalohydrin is epichlorohydrin.

69. A thermoplastic compound according to claim 29 wherein said allyl halide is allyl chloride, allyl bromide or a combination thereof.

70. A thermoplastic compound according to claim 31 wherein said nucleophilic end group is —O⁻ or —N₂⁻.

71. A thermoplastic compound according to claim 32 wherein said unsaturated anhydride is maleic anhydride.

72. A thermoplastic compound according to claim 33 wherein said oxidizing agent is a peroxy or haloperoxy acid or anhydride.

73. A thermoplastic compound according to claim 38 wherein said thermoplastic compound is present in an amount of 0.01% to 30% by weight.

74. A thermoplastic compound according to claim 73 wherein said thermoplastic compound is present in an amount of 0.1% to 15% by weight.

75. A thermoplastic compound according to claim 39 wherein said surface treated material is a reinforcing material.

76. A thermoplastic compound according to claim 41 wherein said silane is methacrylsilane or aminosilane.

77. A thermoplastic compound according to claim 46 wherein said mineral containing additive is chalk, mica or graphite.

78. A thermoplastic compound according to claim 49 wherein said mixing to form a blend is by co-extrusion, compounding or milling.

79. A thermoplastic compound according to claim 53 or 54 wherein said natural polymer is cellulose or a derivative thereof.

80. A thermoplastic compound according to claim 53 or 54 wherein said synthetic polymer is synthetic rubber.

81. A thermoplastic compound according to claim 55 wherein said particles and/or fibers are selected from the group consisting of cellulose, chalk, mica, glass particles, glass fibers, carbon fibers, graphite fibers, aramid fibers, steel fibers, thermoplastic fibers and mixtures thereof.

82. A thermoplastic compound according to claim 56 wherein said silane is methacrylsilane or aminosilane.

83. A thermoplastic compound according to claim 58 wherein said primary or secondary reactive site of said chain terminated hyperbranched dendritic macromolecule of the polyester type is an epoxide group, an amino group, an alkylene group or an anhydride group.

* * * * *